US 8,271,530 B2

(12) United States Patent
Chatterjee et al.

(10) Patent No.: US 8,271,530 B2
(45) Date of Patent: *Sep. 18, 2012

(54) METHOD AND MECHANISM FOR MANAGING AND ACCESSING STATIC AND DYNAMIC DATA

(75) Inventors: Surojit Chatterjee, Foster City, CA (US); Sameer Joshi, San Jose, CA (US); Alok Kumar Srivastava, Newark, CA (US)

(73) Assignee: Oracale International Corporation, Redwood Shores, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 10/845,016

(22) Filed: May 12, 2004

(65) Prior Publication Data

US 2004/0210582 A1  Oct. 21, 2004

Related U.S. Application Data

(63) Continuation-in-part of application No. 10/304,449, filed on Nov. 25, 2002, now Pat. No. 7,672,945.

(60) Provisional application No. 60/370,963, filed on Apr. 8, 2002, provisional application No. 60/372,186, filed on Apr. 12, 2002.

(51) Int. Cl.
*G06F 7/00* (2006.01)
*G06F 17/30* (2006.01)

(52) U.S. Cl. ..................................... 707/786

(58) Field of Classification Search ............... 707/1–10, 707/100 S, 200 S, 786, 999.001
See application file for complete search history.

(56) References Cited

U.S. PATENT DOCUMENTS

| 4,817,091 | A | | 3/1989 | Katzman et al. |
| 5,551,027 | A | * | 8/1996 | Choy et al. ................. 707/201 |
| 5,832,484 | A | * | 11/1998 | Sankaran et al. ............. 707/8 |
| 6,016,499 | A | | 1/2000 | Ferguson |
| 6,067,584 | A | | 5/2000 | Hayles et al. |
| 6,185,734 | B1 | * | 2/2001 | Saboff et al. ................ 717/164 |
| 6,327,594 | B1 | | 12/2001 | Van Huben et al. |
| 6,345,382 | B1 | | 2/2002 | Hughes |
| 6,446,092 | B1 | * | 9/2002 | Sutter ......................... 707/203 |
| 6,584,476 | B1 | | 6/2003 | Chatterjee et al. |
| 6,697,795 | B2 | | 2/2004 | Holcomb |
| 6,711,571 | B2 | | 3/2004 | Putzolu |
| 6,807,181 | B1 | * | 10/2004 | Weschler ..................... 370/400 |
| 6,966,058 | B2 | | 11/2005 | Earl et al. |

(Continued)

OTHER PUBLICATIONS

Devarakonda, M. et al. "Recovery in the Calypso File System" ACM Transactions on Computer Systems, Aug. 1996, vol. 14, No. 3, pp. 287-310.

(Continued)

*Primary Examiner* — Kimberly Wilson
(74) *Attorney, Agent, or Firm* — Vista IP Law Group, LLP

(57) ABSTRACT

Disclosed is a method, mechanism, and computer usable medium for managing and accessing static and shard data. In one approach, described is a method and mechanism for implementing group dependent keys (GDKs) in a computing system, in which the GDK is visible to all members of a distributed system, but its value(s) and subtree(s) could be different for different groups. Members of each group see the same view of the value and subtree of a GDK. Also disclosed is a method, mechanism, and computer usable medium for implementing group dependent links (GDLs) in a computing system. According to one approach, a data transformation function is used to coordinate changes to different versions of shared data.

54 Claims, 19 Drawing Sheets

U.S. PATENT DOCUMENTS

| | | | |
|---|---|---|---|
| 7,003,677 B1* | 2/2006 | Herzberg et al. | 713/180 |
| 7,117,495 B2 | 10/2006 | Blaser et al. | |
| 7,260,818 B1 | 8/2007 | Iterum et al. | |
| 7,305,669 B2 | 12/2007 | Roush | |
| 7,318,070 B2 | 1/2008 | McGee et al. | |
| 7,451,434 B1 | 11/2008 | Blumenthal et al. | |
| 2001/0005848 A1* | 6/2001 | Haverstock et al. | 707/1 |
| 2001/0056461 A1* | 12/2001 | Kampe et al. | 709/201 |
| 2002/0143764 A1 | 10/2002 | Martin et al. | |
| 2002/0156875 A1* | 10/2002 | Pabla | 709/220 |
| 2003/0046430 A1* | 3/2003 | Iwade et al. | 709/246 |
| 2003/0097637 A1* | 5/2003 | Tozawa et al. | 715/513 |
| 2003/0131246 A1* | 7/2003 | Reeves et al. | 713/182 |
| 2003/0135755 A1* | 7/2003 | Hahn | 713/201 |
| 2003/0191739 A1 | 10/2003 | Chatterjee et al. | |
| 2004/0210582 A1 | 10/2004 | Chatterjee et al. | |
| 2005/0257211 A1 | 11/2005 | Chatterjee et al. | |
| 2006/0031532 A1* | 2/2006 | Sanders | 709/227 |

OTHER PUBLICATIONS

Ganger, G.R. et al. "Embedded Inodes and Explicit Grouping: Exploiting Disk Bandwidth for Small Files" Proceedings of the USENIX Techinal Conference. (Jan. 1997) pp. 1-17.

Gray, J. et al. "Transaction Processing: Concepts and Techniques" 1993, Title page, pp. 556-558, Morgan Kaufmann Publishers, Inc., San Francisco, CA.

McKusick, M.K. et al. "A Fast File System for UNIX" ACM Transactions on Computer Systems, Feb. 18, 1984, pp. 1-14.

Pfister, G.F. "In Search of Clusters, The Ongoing Battle in Lowly Parallel Computing" 2nd Ed., 1995, Title page, pp. 71-84, Prentice Hall PTR, Upper Saddle River, NJ.

Read, T. et al. "Robust Clustering: A Comparison of Sun™ Cluster 3.0 versus Sun Cluster 2.2 Software" Sun BluePrints™ OnLine (Sep. 2001) pp. 1-23.

Rosenblum, M. et al. "The Design and Implementation of a Log-Structured File System", Jul. 24, 1991, pp. 1-15.

Smith, K. et al. "File Layout and File System Performance" Harvard University Computer Science Technical Report 35-94, 1994 pp. 1-23.

Vogels, W. et al. "The Design and Architecture of the Microsoft Cluster Service, A Practical Approach to High-Availability and Scalability" Cornell University Department of CS Technical Report, May 1997, 10 pages.

Vogels, W. et al. "Scalability of the Microsoft Cluster Services" Proceedings of the 2nd USENIX Windows NT Symposium, 1998, pp. 11-20.

Ylönen, T. "Shadow Paging is Feasible" 1994, pp. 1-15.

Ylönen, T. "Write Optimizations and Clustering in Concurrent Shadow Paging" 1993, pp. 1-16.

Ylönen, T. "Concurrent Shadow Paging: A New Direction for Database Research" 1992, pp. 1-7.

Compaq Computer Corporation, UNIX Software Division "Cluster File System in Compaq TruCluster Server, Extending the advantages of single-system file systems to high availability cluster", Sep. 2001, pp. 1-13.

Hewlett-Packard Company, UNIX Software Division "The Gold Standard: Cluster File System in HP TruCluster Server, Extending the advantages of single-system file systems to high availability clusters", Oct. 2002, pp. 1-16.

Microsoft Corporation "Microsoft® Windows2000 Advanced Server, Windows 2000 Clustering Technologies: Cluster Service Architecture", 2000, pp. 1-23.

Oracle Corporation "Oracle8i Administrator's Guide, Release 2 (8.1.6)", Dec. 1999, Title page, Chapter 16 (pp. 1-12), Oracle Corporation, Redwood City, CA.

Sun® Microsystems, Inc. "The Sun Enterprise Cluster Architecture, Technical White Paper", 1997, pp. 1-74.

Office Action dated Apr. 15, 2009 for U.S. Appl. No. 10/844,875.

Office Action dated Feb. 5, 2008 for U.S. Appl. No. 10/844,875.

Office Action dated Oct. 28, 2008 for U.S. Appl. No. 10/845,875.

Non-Final Office Action dated Apr. 15, 2009 for U.S. Appl. No. 10/844,875.

Non-Final Office Action dated Feb. 5, 2008 for U.S. Appl. No. 10/844,875.

Final Office Action dated Nov. 12, 2009 for U.S. Appl. No. 10/844,875.

Final Office Action dated Oct. 28, 2008 for U.S. Appl. No. 10/844,875.

Notice of Allowance dated Nov. 26, 2010 for U.S. Appl. No. 10/844,875.

* cited by examiner

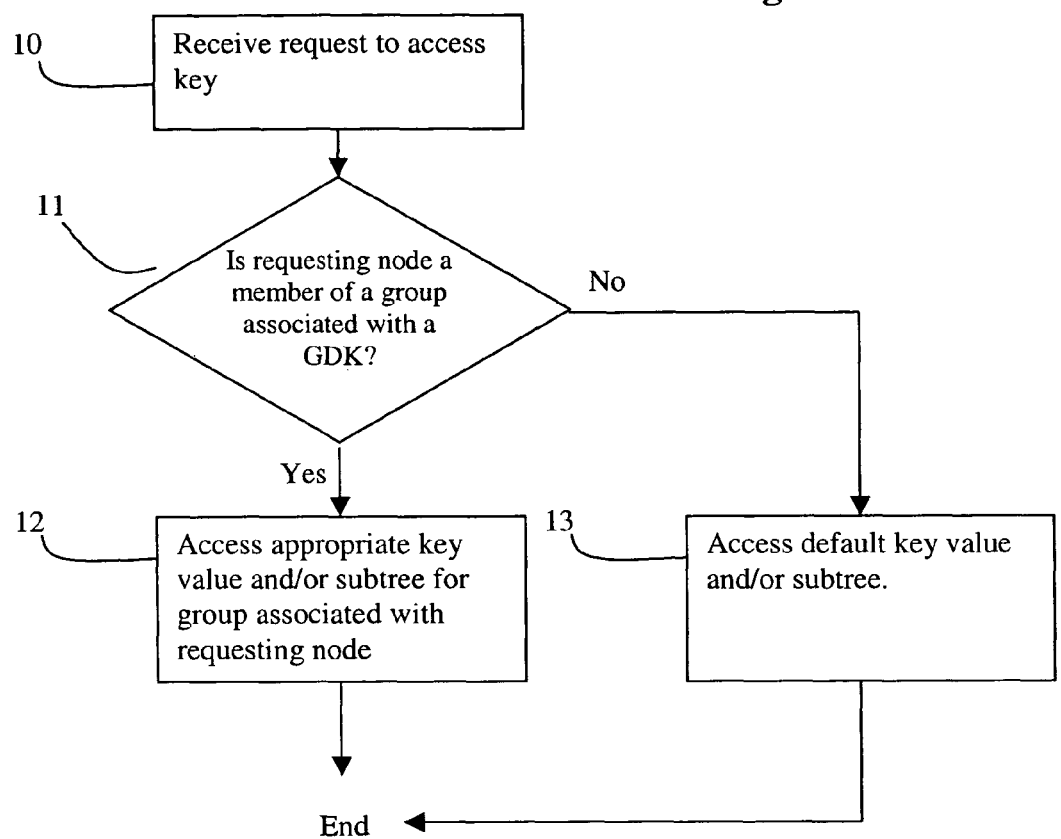

METHOD AND MECHANISM FOR MANAGING AND ACCESSING STATIC AND DYNAMIC DATA

CROSS-REFERENCE TO RELATED APPLICATIONS

The present application is a continuation-in-part of U.S. application Ser. No. 10/304,449, filed on Nov. 25, 2002, now U.S. Pat. No. 7,672,945, which claims priority to the following provisional U.S. Patent Applications: (a) U.S. Provisional Patent Application No. 60/370,963 entitled "Personalized Content Within a Global Namespace", filed Apr. 8, 2002; and (b) U.S. Provisional Patent Application No. 60/372,186 entitled "Approach for Personalized Content Within a Global Namespace", filed Apr. 12, 2002, which are all hereby incorporated by reference in its entirety.

BACKGROUND AND SUMMARY

A data model provides the general structure of a database. A data model can be viewed as a collection of conceptual tools for describing data, data relationships, data semantics, and consistency constraints. It is often useful to model data in a hierarchical structure. In a hierarchical model, data and relationships among data are represented by records and links, respectively. Hierarchically modeled data is logically structured as a "tree", which includes a conglomeration of parent-child relationships between data within the hierarchical structure. LDAP (Lightweight Directory Access Protocol), Microsoft® Windows® registry, and Oracle® Cluster Registry are examples of uses of hierarchically modeled or structured information.

FIG. 1 is a diagram graphically illustrating hierarchically structured, or related, data. Structuring data hierarchically provides some benefits over other data structures. It is easier to explore hierarchically structured data than other data structures, due to the inherent semantic benefits of the hierarchical structure. For example, one can intuitively traverse a hierarchy to locate a specific data item of interest.

Hierarchically organized data is often represented by a key name-value (or name-value) pair. More specifically, each item of information is identified within the hierarchy by a key name consisting of key components. The term "key name" is generally used herein to refer to a specific value within the key domain associated with the hierarchy. For example, a key domain may be network IP addresses and an associated key name may be 255.255.000.000. For another example, a domain may be the collection of URLs associated with the public Internet, and an associated key of the domain may be a specific URL associated with a specific web page.

For example, a file's location in a hierarchical directory may be identified as: C:\My Documents\example.doc, wherein each backslash separates levels of the associated hierarchy. More generally, information may be identified by a key name represented as a character string, such as a.b.d.e, where key component e is a child (i.e., a descendant) of key component d, key component d is a child of key component b, and so on, to the hierarchy root. In some contexts, hierarchically organized information contains name-value pairs. A value is information associated with a name. For example, in the foregoing hierarchical directory path, "My Documents\example.doc" is a name of a name-value pair. The content of this file is the value of the name-value pair.

FIG. 1 illustrates that a hierarchical structure has levels associated with the structure, and thus, the key name. That is, each key name has as many levels as the number of key components in the key name. For example, items x and a are one level from the root, so they are considered at Level 1; items z, c, and d are three levels from the root and are considered at Level 3.

A distributed system may include multiple logical computational units. Each logical computational unit may be referred to as a "member" of the distributed system. Thus, a member may be a network-connected personal computer, workstation, central processing unit (CPU), a type of computing node, or other logical computational unit such as an instance of a program. Members of a distributed system can communicate with each other.

A "group" includes a subset of members within a distributed system. A group can have a minimum of one member and a maximum of all members in a distributed system. In an embodiment, a group may be created or modified to have zero present members.

Multiple members of a distributed system may share a common entity. One such shared entity is a shared storage device or file system. All of the members in the distributed system may directly access the shared storage device or file system (e.g., through a network). All of the members in the distributed system can see a given file within the shared storage device or file system. All of the members within the distributed system may access the contents of the given file. In other words, the data that are contained in the file would be "public" or "global" to all members and not "private" to any particular member.

It is common for one member of a distributed system to be one instance of a particular computer program, and for another member of the distributed system to be another instance of the same computer program. Each member of a distributed system may be a different instance of the computer program. Each instance may be able to communicate with each other instance. The particular computer program may be, for example, a database server. The particular computer program may execute, for example, in the form of multiple concurrent processes.

All instances of the particular computer program may attempt to read or write to the same particular location and/or file (such as a configuration file) in the shared file system. The particular computer program might not have been designed to operate on a shared file system. Therefore, by overwriting a value in the particular file, one instance of the particular program may cause the other instance of the computer program to subsequently read an incorrect value. Such data conflicts constitute a problem.

This problem particularly impacts registries, e.g., shared registries. A registry is a data repository that stores configuration information. A single registry may store configuration information that are stored on a single shared storage subsystem. A registry may organize data according to the hierarchical data model described above. Configuration information for multiple databases may be hierarchically organized beneath a single root.

One example of a multi-instance database server is RAC, which can have multiple instances of the same program running as multiple members of a distributed system. To communicate with each other, each of these instances listen to specific ports. For example, a key like "RAC.instancename" could be created in a shared (between all the instances of RAC) configuration repository such as a registry. Each instance of RAC stores its name as a value of the key "RAC.instancename". Consequently, every time, after the first time, that an instance of RAC stores its name as a value of this key, the previous value of this key will be overwritten. This results in a data conflict.

Many applications require that the multiple members of a distributed system (such as instances of the same computer program) refer to a piece of data in the global repository by the same name but read or write a value that is specific for each instance.

Computer programs, such as database servers, may be modified to access separate instances of files (or registry entries) in a shared file system (or registry). However, such modification is impossible when source code is unavailable. Even when source code is available, source code modification is time-consuming and expensive. Often times it is not desirable.

These problems may be further exasperated based upon the type/category of data that is being managed and/or accessed. Some example categories of data include private data and shared data. Private data includes data that are only associated or accessible by a designated group of one or more members. Shared data may be accessed by multiple different members or groups of members. Subcategories of shared data include static shared data and dynamic shared data. Static shared data corresponds to shared data that are accessed by multiple different members or groups of members using the same key, but in which it is contemplated that the data will either never change or will change only under sparse circumstances. Therefore, it is likely that once this type of data is set to a particular value, it will not normally change to another value. An example of this type of data is application or system metadata, e.g., node identification numbers. Dynamic shared data corresponds a type of shared data in which it is contemplated that the data may possibly change on a more frequent or regular basis. An example of this type of data is program state data for a running application that is constantly being updated and persisted to disk. It can be a challenging task to implement a mechanism to efficiently manage shared data, particularly when the shared data includes dynamic shared data that may change over time, rather than only static data that may never or only infrequently change in value.

Embodiments of the present invention provide a method, mechanism, and computer usable medium for implementing group dependent keys (GDKs) in a computing system. According to one embodiment, a GDK is visible to all members of a distributed system, but its value(s) and subtree(s) could be different for different groups. Members of each group see the same view of the value and subtree of a GDK. Additional embodiments of the present invention provide a method, mechanism, and computer usable medium for implementing group dependent links (GDLs) in a computing system. According to one embodiment, a data transformation function (DTF) is used to coordinate changes to different versions of dynamic shared data.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using like reference numbers.

FIG. 3A shows a flowchart of a process for accessing a group dependent key according to one embodiment of the invention.

DETAILED DESCRIPTION

Embodiments of the present invention provide a method, mechanism, and computer usable medium for implementing group dependent keys (GDKs), group dependent links (GDLs), and data transformation functions (DTFs) in a computing system to manage and access static and dynamic data. While the present description is illustrated using terminology relating to "keys" as a particular example of an index type that may be used in conjunction with the present invention, it is noted that the present invention may be used with other index types and data access structures, and thus is not limited in its application to keys. Thus, the term "key" as used herein also encompasses other kinds of index types and data access structures/identifiers.

Group Dependent Key

According to one embodiment, a group dependent key is visible to all members of a distributed system, but its value(s) and subtree(s) could be different for different groups. Members of each group see the same view of the value and subtree of a group dependent key. Therefore, a single key name or description can be accessed by all members, but different values will be visible to different members. Both the term "key name" and/or "key description" may be used herein to generally refer to any mechanism for implementing a key identifier or data identifier (or any other suitable index structure). Among other things, a GDK is useful to manage and access data having values that differ between members of multiple groups.

Figure 1:
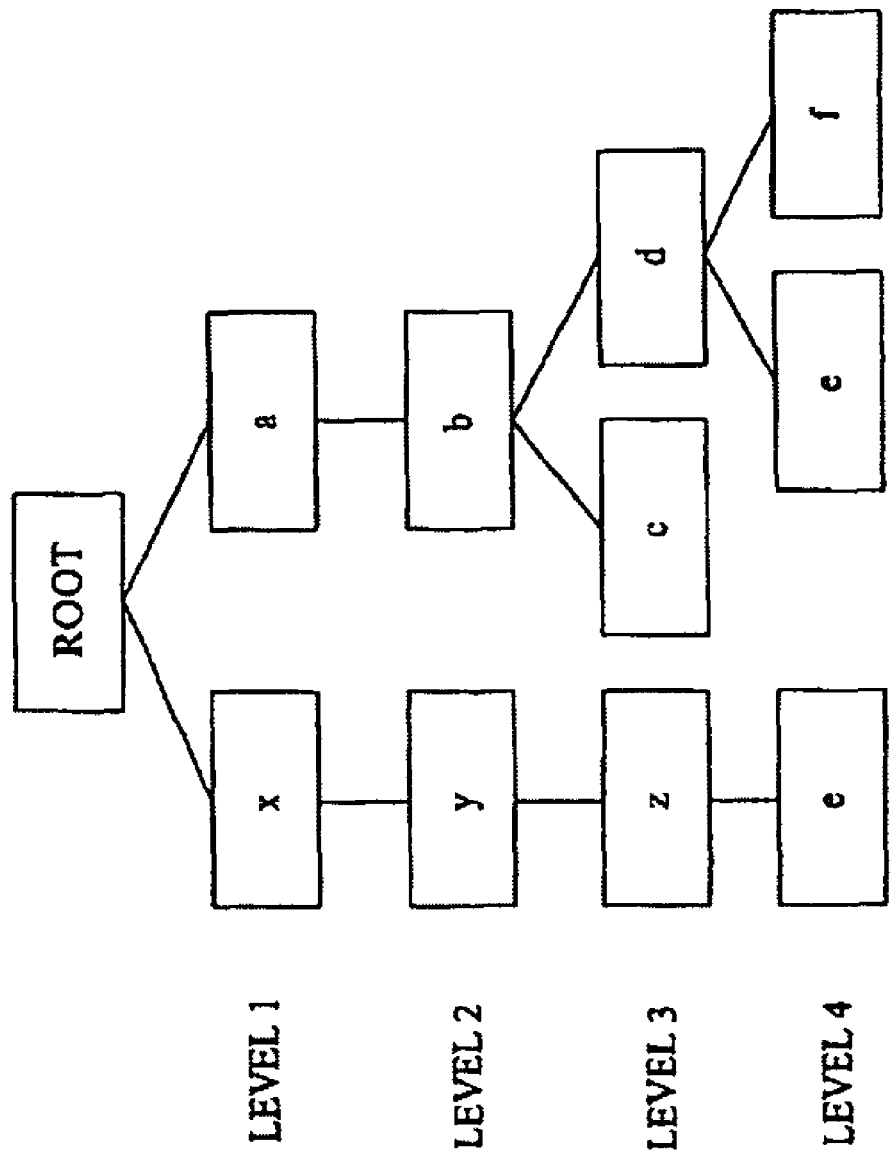
FIG. 1 is a diagram graphically illustrating hierarchically structured, or related, data.
Figure 2:
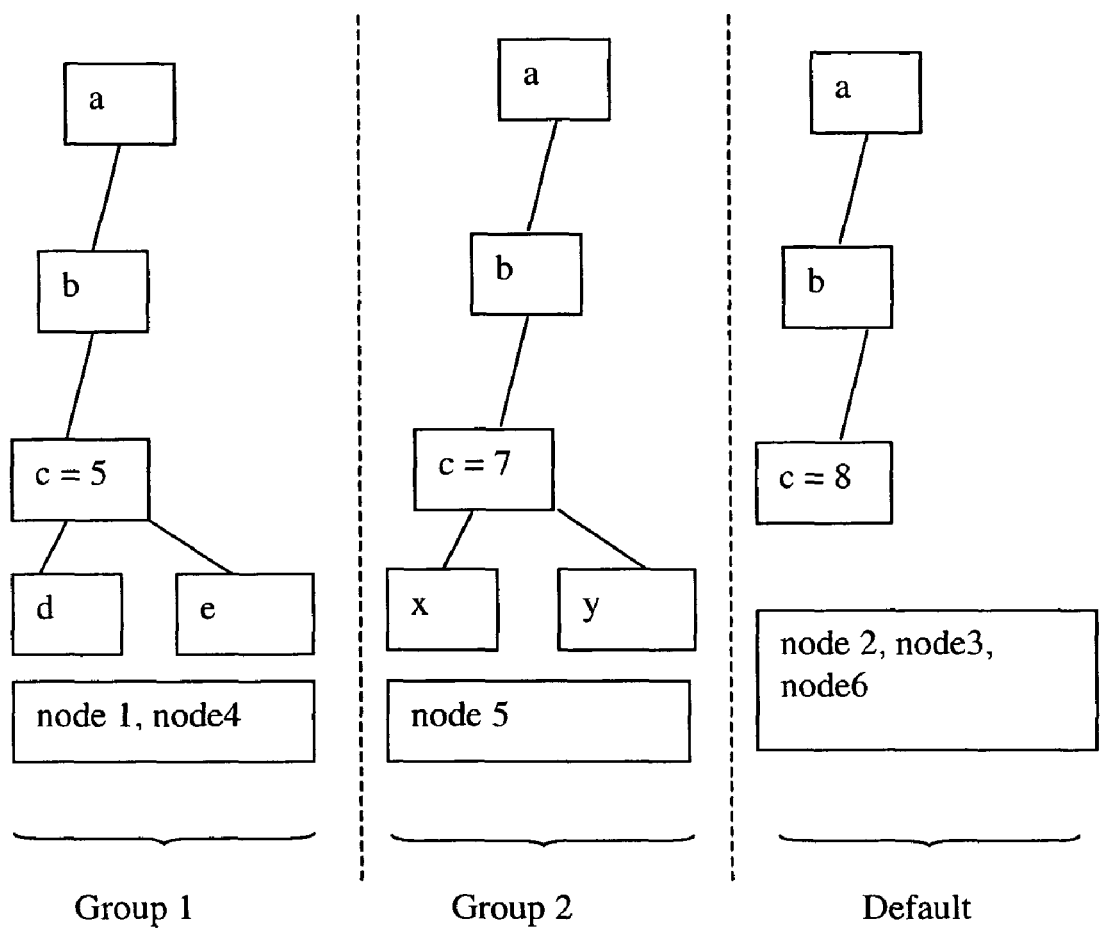
FIG. 2 illustrates an example set of group dependent keys according to one embodiment of the invention.

To illustrate a GDK, consider the scenario shown in FIG. 2. In the distributed system of FIG. 2, assume that there are six nodes in a cluster—node1, node2, node3, node4, node5, node6. Further assume that it is desired to have a key "a.b.c" that has a value and/or subtree which is different for different nodes within the distributed system. This can be accomplished by implementing key a.b.c as a group dependent key.

It is noted that the term "node" is used illustratively herein, and may equally refer to any type of entity in the system, such as a network-connected personal computer, workstation, central processing unit (CPU), or other logical computational unit such as an instance of a program.

In the example of FIG. 2, a group 1 has been established having members node1 and node4. For the members of group 1, group dependent key a.b.c has a value of "5" and a subtree consisting of "a.b.c.d" and "a.b.c.e". Any member within group 1 that seeks to access key a.b.c will retrieve this key value and will be able to access these specified subtrees.

Another group 2 has been established, which in this example has a single member node5. For the members of group 2, key a.b.c has a value of "7" and a subtree consisting of "a.b.c.x" and "a.b.c.y". Any member within group 2 that seeks to access key a.b.c will retrieve this key value and will be able to access these specified subtrees.

In one embodiment, if a node is not explicitly assigned to a particular group, then a default key value and subtree would be associated with those nodes. Nodes node2, node3, and node6 have not been explicitly assigned to groups 1 and 2. Therefore, any access by these nodes to key a.b.c will result in access of a default value/subtree for this key. In the present example, key a.b.c has a default value of "8" and no subtree.

A "member dependent key" is a key that is visible to a single member of system, where the key value(s) and/or subtree(s) could be different for other members. Therefore, a single key name/description can be accessed by all members, but different values will be visible to each member.

It can be seen that a member dependent key can be created in the present embodiment by creating a group dependent key having only a single member associated with the group. In the example of FIG. 2, the group dependent key associated with Group 2 is effectively a member dependent key since only a single member (i.e., Node 5) is a member of Group 2. Therefore, member dependent keys can be formed as a subset class of group dependent keys in which a particular group associated with a group dependent key has only a single member. Furthermore, since member dependent keys can be formed as a subset class of group dependent keys, both group dependent keys and member dependent keys can co-exist in the same distributed system, as shown in the example of FIG. 2.

FIG. 3A shows a flowchart of a process for implementing group dependent keys according to an embodiment of the invention. A request is received to access a group dependent key (10). For example, a request may be issued to read or modify the value of the key. The request may also seek to access a value at a subtree to the group dependent key.

A determination is made to identify whether the requesting node is a member of an group associated with the group dependent key (11). Any number of groups may be associated with the group dependent key, with each group potentially (but not necessarily) having differing values or subtrees for the key. As is evident to those skilled in the art, any number of structures may be utilized to track the membership and values for group dependent keys. For example, relational database tables may be used to track the group dependent keys, group memberships, and links to storage locations for different key values, with such information stored within various columns within the relational database tables. These structures may be searched to identify the specific group, if any, that is associated with the requesting node, as well as the key value or a link to the storage location containing the key value.

If the requesting node is a member of a group, then the process accesses the appropriate key value and/or subtree for the group associated with the requesting node (12). If the data access request is to modify the key value, then the value at the appropriate storage location is modified pursuant to the request.

If the requesting node is not a member of a group, then the process accesses the default key value and/or subtree (13). If the data access request is to modify the key value, then the value at the appropriate storage location for the default value is modified pursuant to the request.

Figure 4:
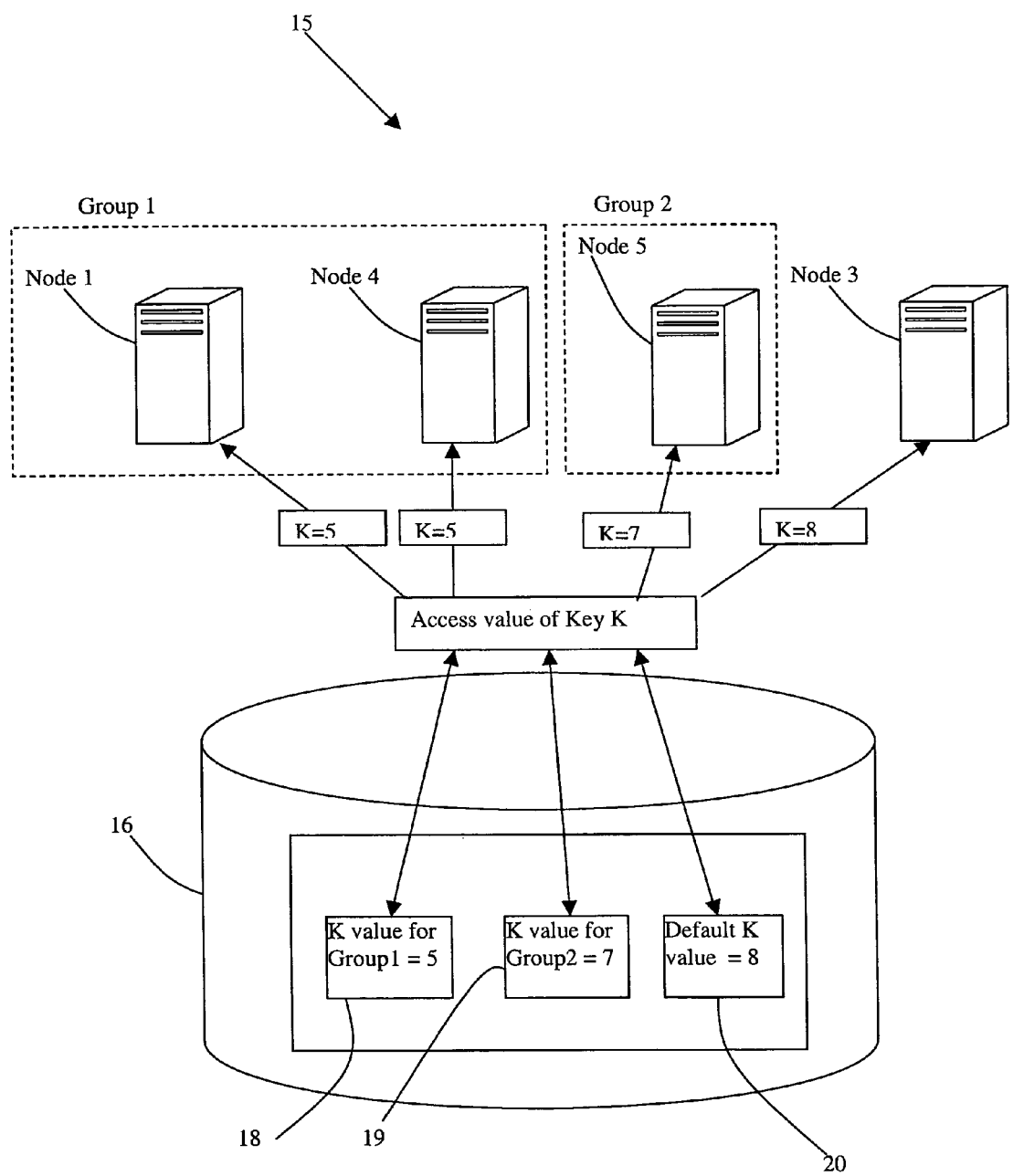
FIG. 4 is an architectural diagram of a distributed system using group dependent keys according to one embodiment of the invention.

FIG. 4 illustratively shows an example architectural configuration utilizing a GDK. For purposes of this example, a group dependent key K is referenced by node1, node3, node4, and node5 in distributed system 15. Assume that a group 1 has been established having members node 1 and node4. For the members of group 1, group dependent key K has a value of "5". In this architectural configuration, the key value for K associated with group 1 is stored at a private storage location 18 within storage device 16. Any access to key K for members of group 1 will retrieve or modify the value stored at storage location 18.

Similarly, a group 2 has been established having a single member node5. For the members of group 2, key K has a value of "7". In this example architectural configuration, the key value for K associated with group 2 is stored at a private storage location 19 within storage device 16. Any access to key K for members of group 2 will retrieve or modify the value stored at storage location 19.

A default key value of "8" has been associated with key K. Any node that is not explicitly assigned to a group will access the default key value. In this example, the default key value for K is stored at a storage location 20 within storage device 16. Any access to key K by nodes that are not members of a group for this key will retrieve or modify the value stored at storage location 20.

Group Dependent Link

A group dependent link (GDL) is a link between keys that is only visible for the members of a group for which it is created. If a key is a source of a GDL for a first group, then when that key is referenced by members of that group it will actually read the destination of the GDL. It is noted that a GDL becomes a member dependent link (MDL) if the group associated with the GDL contains only a single member. Among other advantages, incompatible changes to both static and dynamic shared data can be addressed by using group dependent links.

There are a number of approaches that can be used to implement a GDL. A first example approach is to implement the GDL as a link from a normal key to a group dependent key (GDK) or member dependent key (MDK). A second example approach is to implement the GDL as one or more private links (e.g., private symbolic links) to normal keys, in which each of the private links are associated with a group wherein members of the groups are directed to a specific normal key.

Figure 5A:
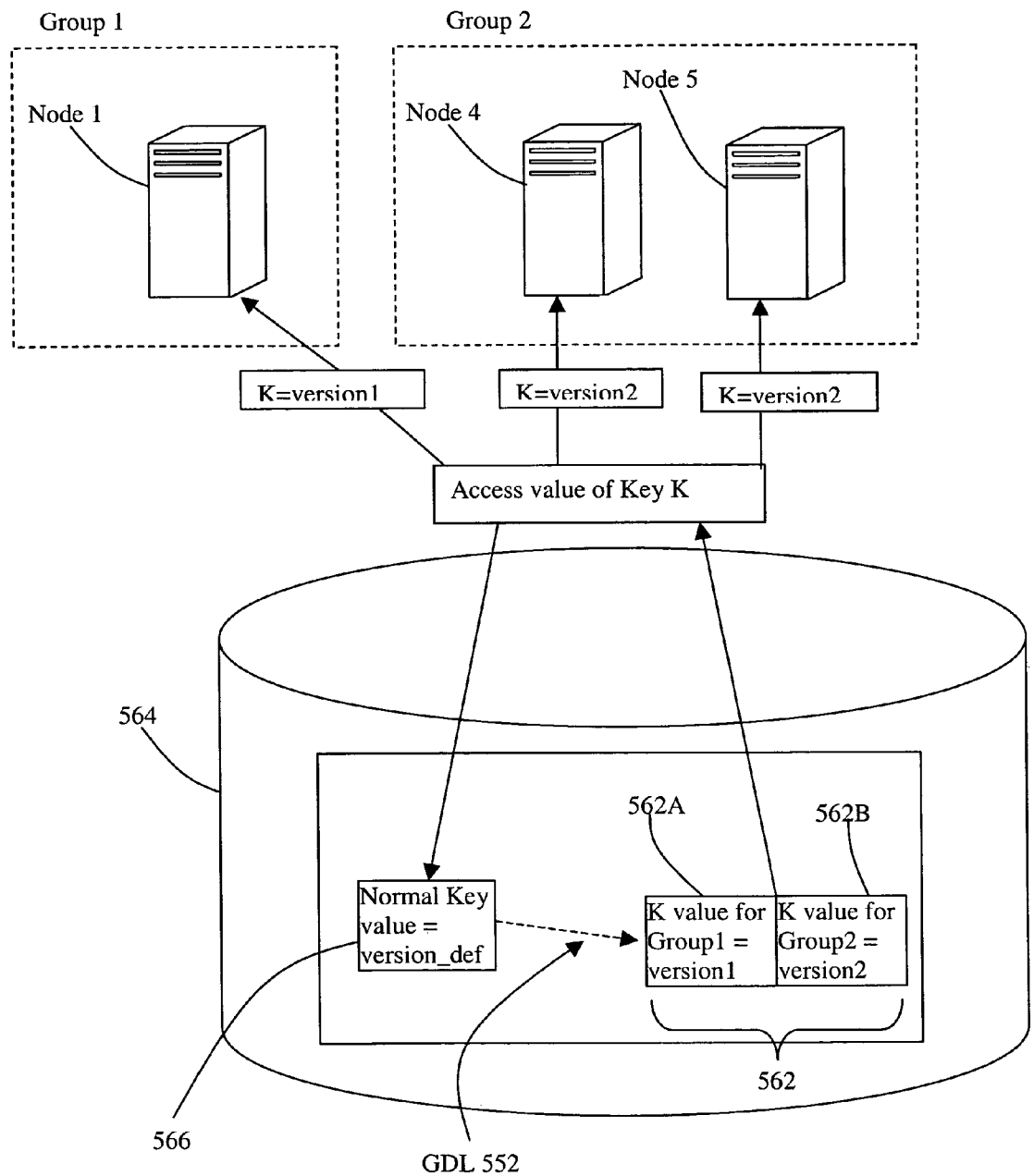
FIGS. 5A-G illustrate DTFSs associated with GDLs and GDKs according to embodiments of the invention.

FIG. 5A conceptually illustrates the first example approach, in which the GDL is implemented as a link from a normal key to a group or member dependent key. In FIG. 5A, three Nodes/Members 1, 4, and 5 are shown that access shared data on a shared disk 564. Assume that the key identifier K refers to a shared data item that is accessed by all three members. The default data storage element for key K is located at location 566 within shared disk 564.

Assume that Node 1 is a member of Group 1 and that Nodes 4 and 5 are both members of Group 2. Further assume that the members of the systems are by default configured to view a first version of the data referenced by key K (version_def), members of Group 1 view a first version of the data referenced by key K (version 1), and members of Group 2 are configured to view a second version of the data referenced by key K (version 2).

In the embodiment of FIG. 5A, this is accomplished by establishing a configuration of the system such that different entities in the system will link from the same key to different versions of shared data in the distributed system. Here, a GDL 552 is established that links from the normal key K to the group dependent key 562. GDK 562 is associated with a first storage location 562A for the key value of K that is associated with members of Group 1 (i.e., version1). GDK 562 is also associated with a second storage location 562B for the key value of K that is associated with members of Group 2 (i.e., version2).

Any access to key K for members of group 1 will follow the GDL 552 to retrieve or modify the value stored at storage location 562A. Therefore, since Node 1 is a member of Group 1, access by this node to key K would result in access to version 1 of the data at storage location 562A. Similarly, any member of Group 2 that seeks to access key K would be linked via GDL 552 to the value stored at storage location 562B. Therefore, since Node 4 and Node 5 are members of Group 2, access by these nodes to key K would cause these nodes to access storage location 562B to access version2 of the data item for key K. Additional MDKs and GDKs can be implemented to allow multiple versions of the shared data to be access by different groups in the system.

Figure 5B:
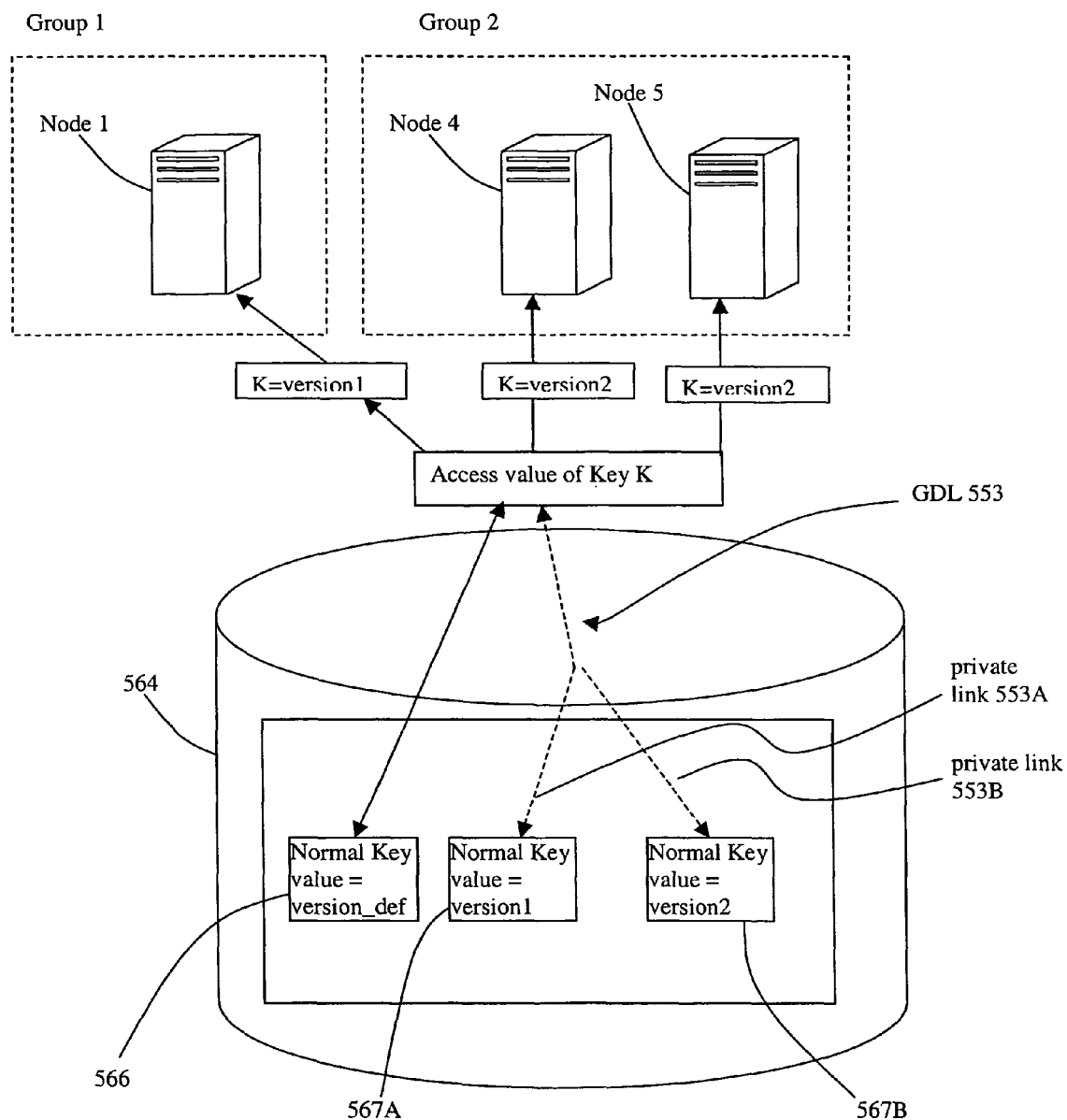

FIG. 5B conceptually illustrates the second example approach for implementing a GDL, which comprises one or more private links (e.g., private symbolic links) to normal keys, in which each of the private links are associated with a group wherein members of the groups are directed to a specific normal key. In FIG. 5B, three Nodes/Members 1, 4, and 5 are shown that access shared data on a shared disk 564. As before, assume that the key identifier K refers to a shared data item that is accessed by all three members. The default data storage element for key K is located at location 566 within shared disk 564. Node 1 is a member of Group 1 and Nodes 4 and 5 are both members of Group 2, in which members of the systems are by default configured to view a first version of the data referenced by key K (version_def), members of Group 1 view a first version of the data referenced by key K (version 1), and members of Group 2 are configured to view a second version of the data referenced by key K (version 2).

In the approach of FIG. 5B, the GDL 553 is implemented by establishing one or more private links 553A and 553B. In one embodiment, the private links are implemented using "private symbolic links". At this point, it is helpful to generally describe a symbolic link. A symbolic link is a logical reference from a first file/pathname to a second file/pathname, which is most commonly used in UNIX-based systems. Most operations (e.g., read and execute operations) that are called to operate upon the symbolic link are instead redirected to operate upon the filename referenced by the symbolic link. Unlike a standard symbolic link, a private symbolic link (PSL) does not provide a universally visible symbolic link between two file/pathnames. Instead, the PSL makes the link between two filenames visible only to members or groups specified or authorized for the PSL. Further details regarding an example implementation and semantics of a PSL that can employed in one embodiment of the invention is described in co-pending U.S. application Ser. No. 10/803,623, filed on Mar. 17, 2004, entitled METHOD AND MECHANISM FOR PERFORMING A ROLLING UPGRADE OF DISTRIBUTED COMPUTER SOFTWARE, which is hereby incorporated by reference in its entirety.

Private link 553A is associated with Group 1 and is configured to point to the key/storage location 567A containing the value for key K that is associated with Group 1 (i.e., version 1). Therefore, GDL 553 will conceptually cause any members of Group 1 (e.g., Node 1) that seek to access key K to follow the appropriate private link for this group (i.e., private link 553A) to the specific key value location 567A that is associated with Group 1.

Similarly, private link 553B is associated with Group 2 and is configured to point to the key/storage location 567B containing the value for key K that is associated with Group 2 (i.e., version 2). Therefore, GDL 553 will conceptually cause any members of Group 2 (e.g., Nodes 4 or 5) that seek to access key K to follow the appropriate private link for this group (i.e., private link 553B) to the specific key value location 567B that is associated with Group 2.

Figure 5C:

FIG. 5C symbolically diagrams the effects of creating a GDL for an example shared data set. Assume that shared data csh is hierarchical in nature in which the root of the data csh has two branches. A first branch csh.a has the value "10" and a second branch csh.b has the value "20". Further assume that a group of members (e.g., Group X) is associated with another version of the shared data (e.g., csh'), in which the shared data is different such that the data csh'.a has the value "100" and there is no longer any need for data item csh.b. Therefore, members will normally expect to see the value "10" when accessing key "csh.a" and will expect to see the value "20" when accessing key "csh.b". In contrast, members of Group X will expect to see the value "100" when accessing key "csh.a" and will never need to access the key "csh.b".

As shown in FIG. 5C, a GDL is created between the root of csh and the root of csh'. The approach of FIG. 5C shows the GDL as being unidirectional, although in alternative embodiments the GDL may be bidirectional or multidirectional. For any members of the group associated with the GDL (e.g., Group X), seeking access to any key within the hierarchy starting from the root of csh will be redirected to the root of csh'. Thus, a request for the data item for key csh.a from a member associated with the GDL will be automatically redirected to csh'.a. For any members not associated with any group corresponding to such GDLs, the default values for csh will be provided.

Figure 5D:
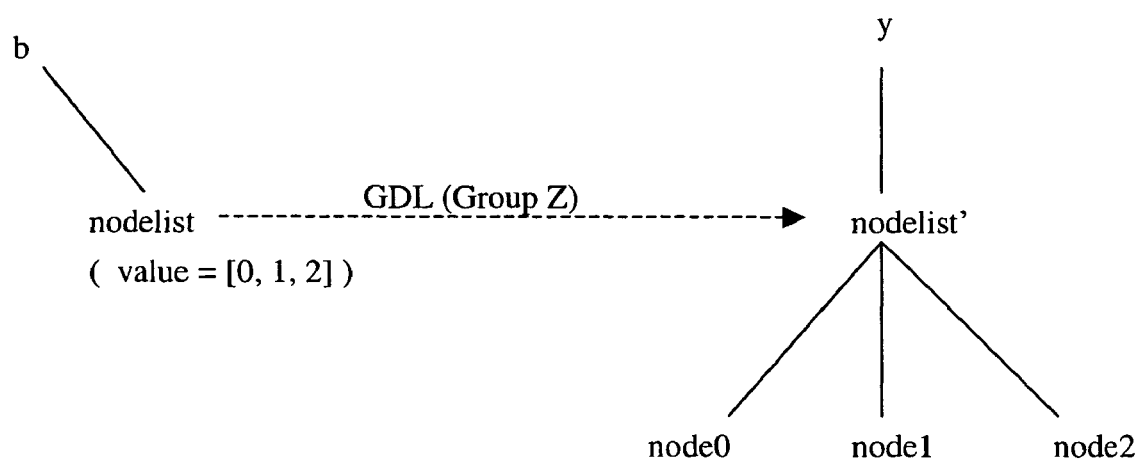

Complex structural differences to the shared data can also be addressed using this approach. Referring to FIG. 5D, consider a first version of a data at key "b.memberlist". This key may refer, for example, to a configuration data element that corresponds to a list of members. For purposes of this example, assume that the range of values for this key is [0,1,2]. Consider if a group of members (e.g., Group Z) is associated with a second version of the shared data for this key, in which the second version for this shared data item is different such that the member value actually becomes another leaf from the part of the hierarchical tree rooted at b.nodelist. Therefore, the second version includes additional key values "b.nodelist.node0", "b.nodelist.node1", and "b.nodelist.node2". This type of change can be implemented by creating an GDL at the proper location in the hierarchical tree, e.g., between "b.nodelist" for the first version of the shared data and "y.nodelist" in the second version of the shared data. Thus, for the member(s) of the Group Z associated with the GDL, a seamless and automatic redirection is performed to allow retrieval of the "b.nodelist.node0", "b.nodelist.node1", or "b.nodelist.node2" key values even though these keys do not even exist in the first version of the shared data, and vice versa.

Figure 3B:
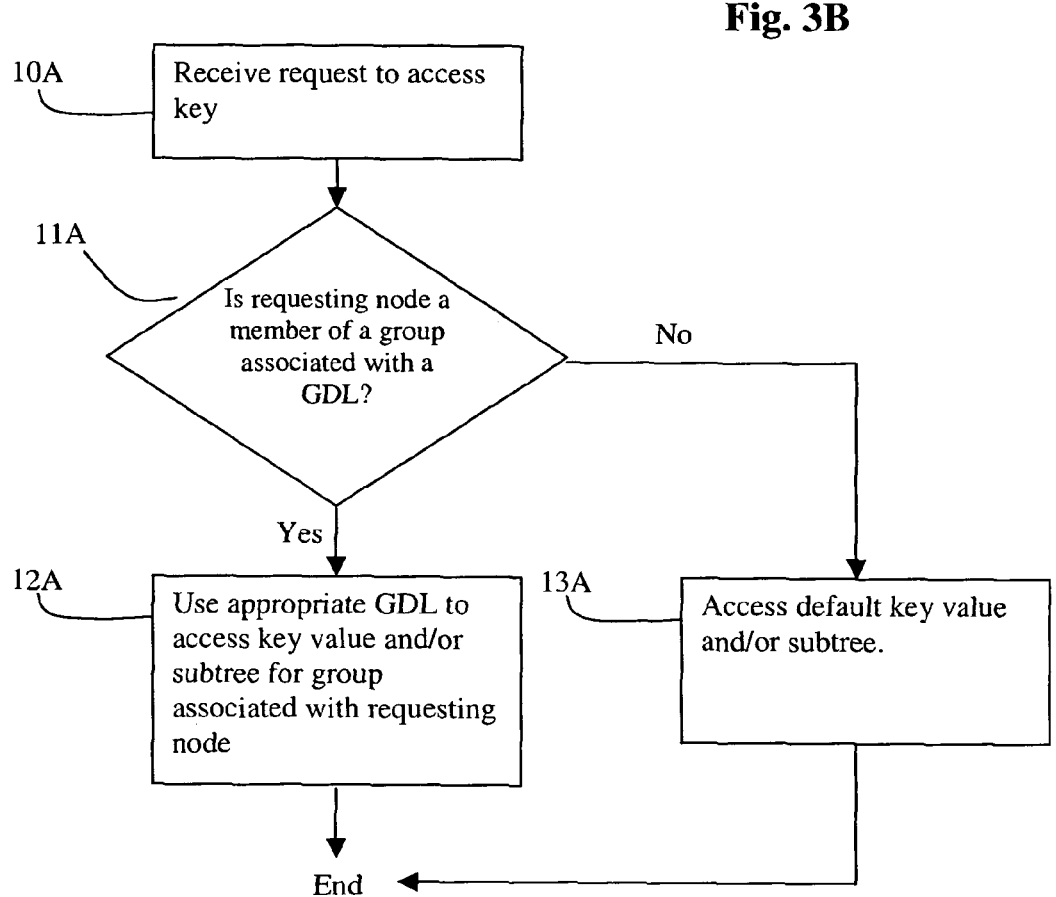
FIG. 3B shows a flowchart of a process for accessing a key with a group dependent link according to one embodiment of the invention.

FIG. 3B shows a flowchart of a process for implementing accessing data using group dependent links according to an embodiment of the invention. A request is received to access a key (10A). For example, a request may be issued to read or modify the value of the key. The request may also seek to access a value at a subtree to the key.

A determination is made whether the requesting node is a member of an group associated with the group dependent link (11A). As is evident to those skilled in the art, any number of structures may be utilized to track the membership and link values for group dependent links. For example, relational database tables may be used to track the group dependent links, group memberships, and links to storage locations for different key values, with such information stored within various columns within the relational database tables. These structures may be searched to identify the specific group, if any, that is associated with the requesting node, as well as the key value or a link to the storage location containing the key value.

If the requesting node is a member of a group associated with a GDL, then the GDL is used to access the appropriate key value and/or subtree (12A). If the data access request is to modify the key value, then the value at the appropriate storage location is modified pursuant to the request.

If the requesting node is not a member of a group, then the process accesses the default key value and/or subtree (13A). If the data access request is to modify the key value, then the value at the appropriate storage location for the default value is modified pursuant to the request.

Data Transformation Function

A data transformation function (DTF) is functionality that transforms the structure or format of one version of a data item into the expected data structure of another version of the data item, and vice versa.

To illustrate an example of a problems that may be addressed using a DTF, consider a distributed system having members that operate upon dynamic shared data. As with static shared data, the two versions of the shared data K and K' may be incompatible with each other. However, there is the added problem that the dynamic shared data may change over time. To maintain proper consistency of the data, the changes made to one version of the data should be reflected in the other version of the data. In other words, when a program makes a change to version K of the data, that change should also be reflected in version K', and vice versa. However, depending upon the data and format configurations for the different data copies, it is possible that the two versions of the dynamic shared data are incompatible with each other. Thus, a member of a first group may expect a particular data element to be in a first storage configuration or in a first data format. A member of a different group may expect that same data element to be in another storage configuration and/or in another data format.

In one embodiment, this problem is addressed by establishing one or more data transformation functions (DTFs) to coordinate changes to the different versions of the dynamic shared data. The DTF transforms the structure or format of one version of the data item into the expected data format/structure of another version of the data item, and vice versa. The DTF may be employed in any appropriate context or structure in which it is useful to provide a transformation of data. For purposes of illustration, the following description will describe DTFs that are associated with GDLs and GDKs.

The DTF provides transformation functionality between two (or more) groups. In one embodiment, the appropriate DTF is created or assigned when a new GDK or GDL is created, e.g., an API is used to create the GDK or GDL and the appropriate DTF(s) are identified or passed to the system via the API. An array of DTFs may be managed which maps the appropriate DTF for transformation between two or more groups. The basis of the mapping may be structured along any appropriate parameters, including group identifiers, GDK identifier, GDL identifier, data identifier, key identifier, storage location, and any other parameter that serves to identify the necessary use for a DTF.

Figure 5E:
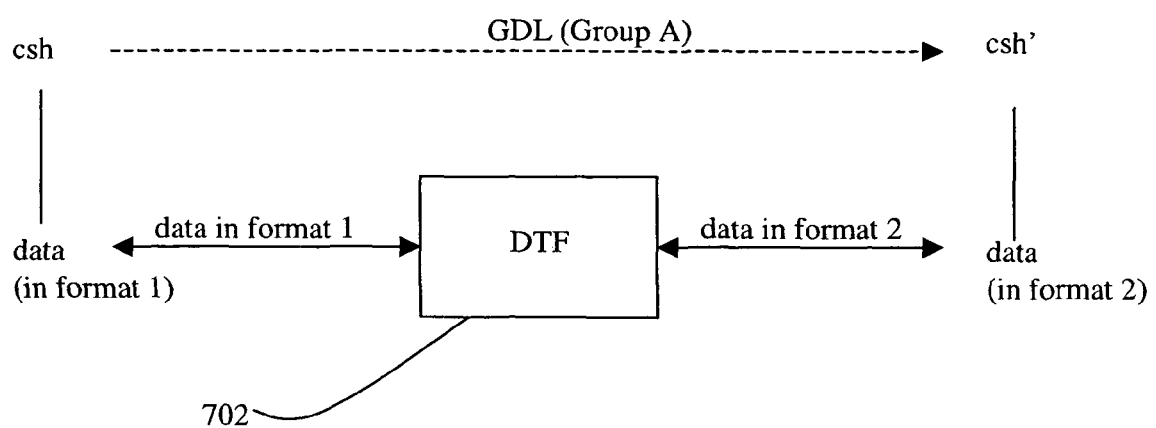

FIG. 5E symbolically diagrams how a DTF can be used with a GDL to address changes to dynamic shared data. The data item of interest has the key "csh.data". Members by default normally expect this shared data item to be in a first format ("format 1"), and correspond to data at csh.data. Members of an example group that has been established (e.g., Group A) expect this shared data item to be in a second format ("format 2"), and correspond to data at csh'.data. When a change is performed to the shared data csh.data in format 1, members of the Group A will need to see the changed data in the second format (csh'.data in format 2). Similarly, when a change is performed to the shared data by a member of Group A (to csh'.data in format 2), the changed data will need to also be updated in the first format (csh.data in format 1).

In the scenario of FIG. 5E, a link, e.g., a member or group dependent link (GDL), is created at the appropriate point in the data hierarchy to redirect data access between the csh.data and csh'.data. For this example, the link points between the root of csh and the root of csh'. A DTF 702 is associated with the GDL. The DTF 702 performs the appropriate transformations between the different versions of the shared dynamic data. Here, DTF 702 provides transformation functionality between data in format 1 and data in format 2.

Whenever a member makes a change to csh.data (which is in format 1), the DTF 702 makes the appropriate transformation to that changed data into format 2 and stores the transformed data into csh'.data. Similarly, whenever a member of the Group A makes a change to csh'.data (which is in format 2), the DTF 702 makes the appropriate transformation to that changed data into format 1 and stores the transformed data into csh.data. In this way, any dynamic changes to the shared data is automatically reflected in the other versions of the shared data items.

By way of a simple example, consider if format 1 is data stored as binary numbers and format 2 is data stored as ascii numbers. The DTF 702 would include a binary_to_ascii routine to convert changes to csh.data from format 1 to format 2 and a ascii_to_binary routine to convert changes from csh'.data from format 2 to format 1. Of course, the DTF can be configured to make any complexity of transformations to the shared data items, depending upon the specific application to which the invention is directed.

Figure 5F:
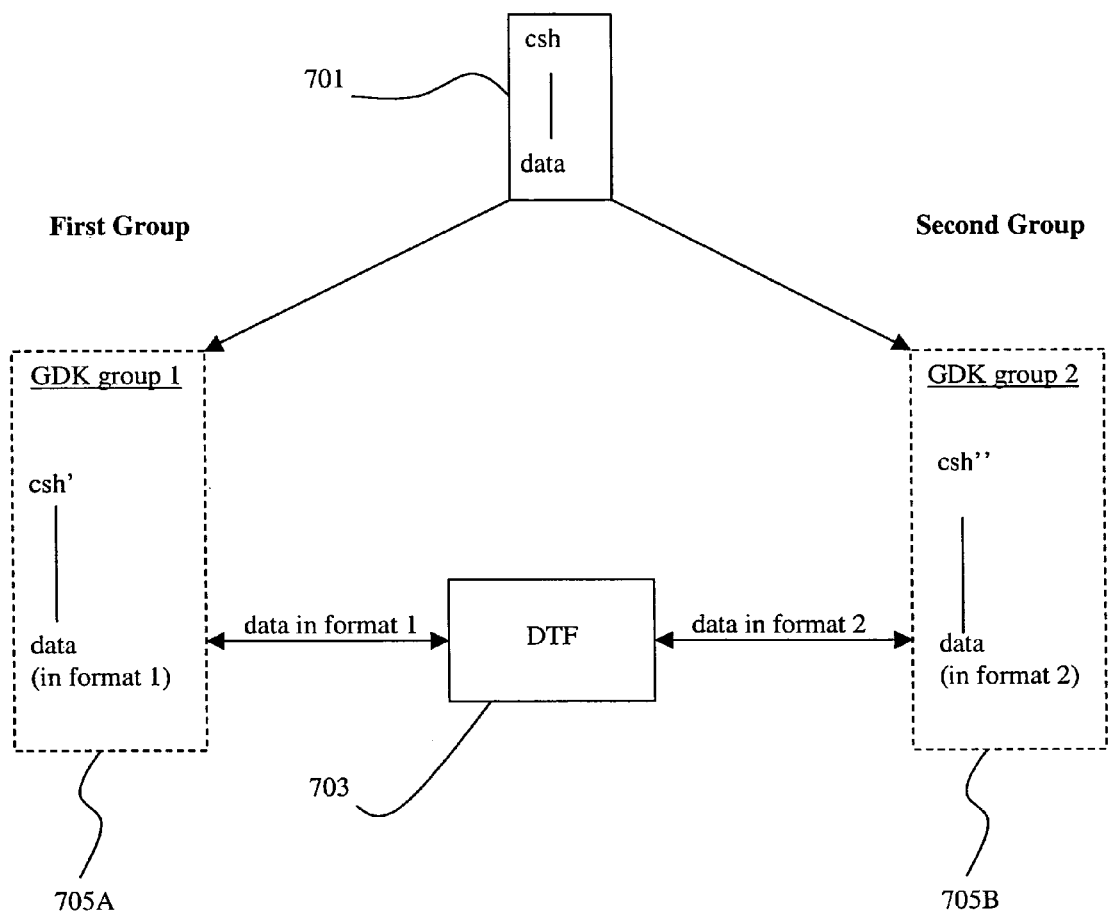

FIG. 5F symbolically diagrams how a DTF can be used with a GDK to address changes to dynamic shared data. Like the example of FIG. 5E, the data item of interest has the key "csh.data", in which members of a first group expect this shared data item to be in a first format ("format 1") corresponding to data at csh'.data and members of a second group expect this shared data item to be in a second format ("format 2") corresponding to data at csh".data. When a change is performed to the shared data by a member of the first group (to csh'.data in format 1), members of the second group will need to see the changed data in the second format (csh".data in format 2). Similarly, when a change is performed to the shared data by a member of the second group (to csh".data in format 2), members of the first group will need to see the changed data in the first format (csh'.data in format 1).

In FIG. 5F, a location 705A has been created to store data for the GDK for key csh.data for the first group. Whenever a member of the first group seeks to access key csh.data, that member will automatically access csh'.data at storage location 705A, which is stored in format 1. Similarly, a second location 705B has been created to store data for the GDK for key csh.data for the second group. Whenever a member of the second group seeks to access key csh.data, that member will automatically access csh".data at storage location 705B, which is stored in format 2.

A DTF 703 is associated with this GDK arrangement. The DTF 703 performs the appropriate transformations between the different versions of the shared dynamic data. Here, DTF 703 provides transformation functionality between data in format 1 and data in format 2.

Whenever a member of the first group makes a change to csh'.data (which is in format 1) at the GDK for storage location 705A, the DTF 703 makes the appropriate transformation to that changed data into format 2 and stores the transformed data into csh".data for the GDK at storage location 705B. Similarly, whenever a member of the second group makes a change to csh".data (which is in format 2), the DTF 703 makes the appropriate transformation to that changed data into format 1 and stores the transformed data into csh'.data. In this way, any dynamic changes to the shared data is automatically reflected in the other versions of the shared data items between the GDKs.

Figure 5G:
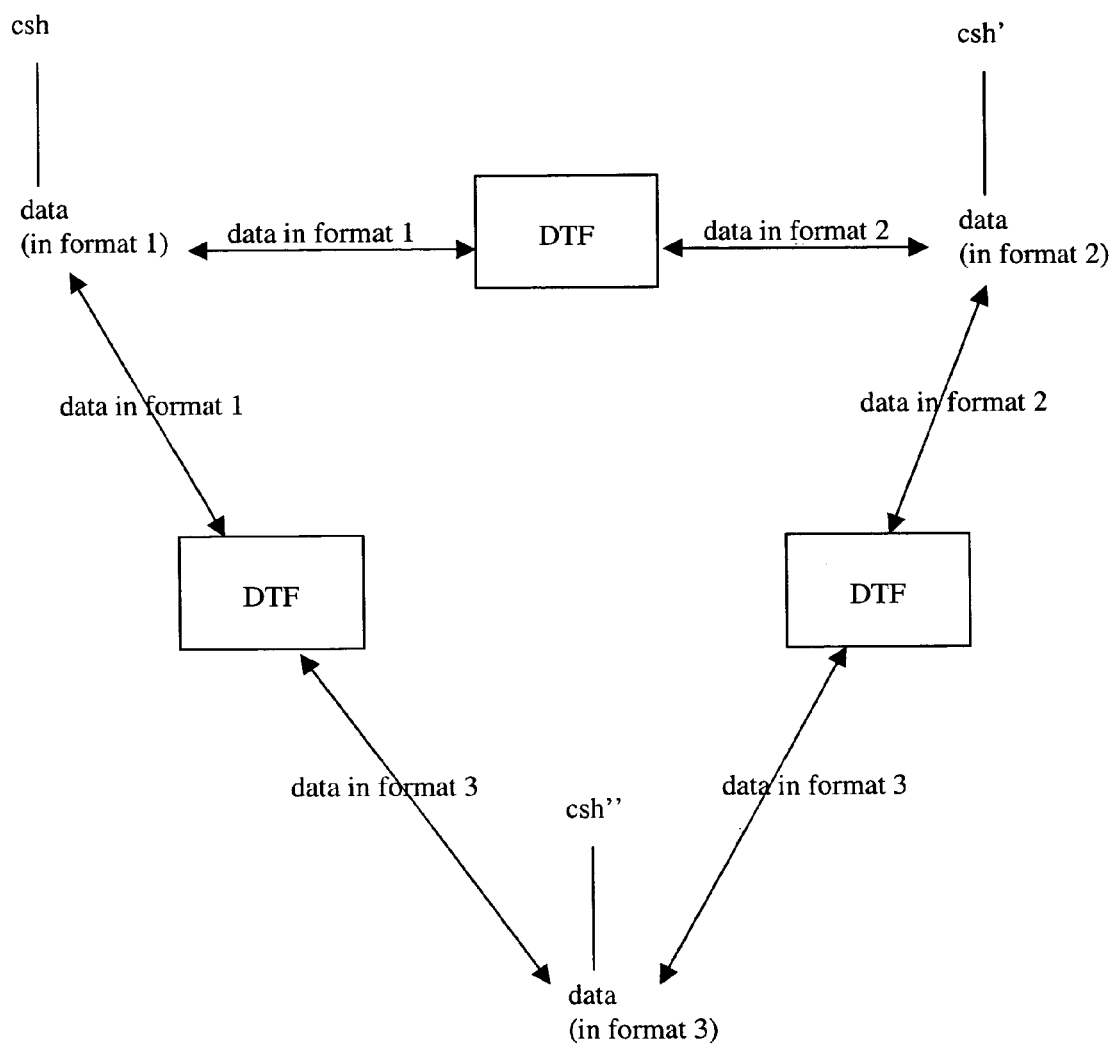

Referring to FIG. 5G, shown is an example configuration in which there are three groups of members, in which a separate DTF is associated between each of the formats that correspond to the different groups. It is noted that any number of DTFs may be employed for the same shared data item, and in one embodiment, the exact number of DTFs is dependent upon the exact data configuration and architecture to which the invention is directed.

Figure 6:
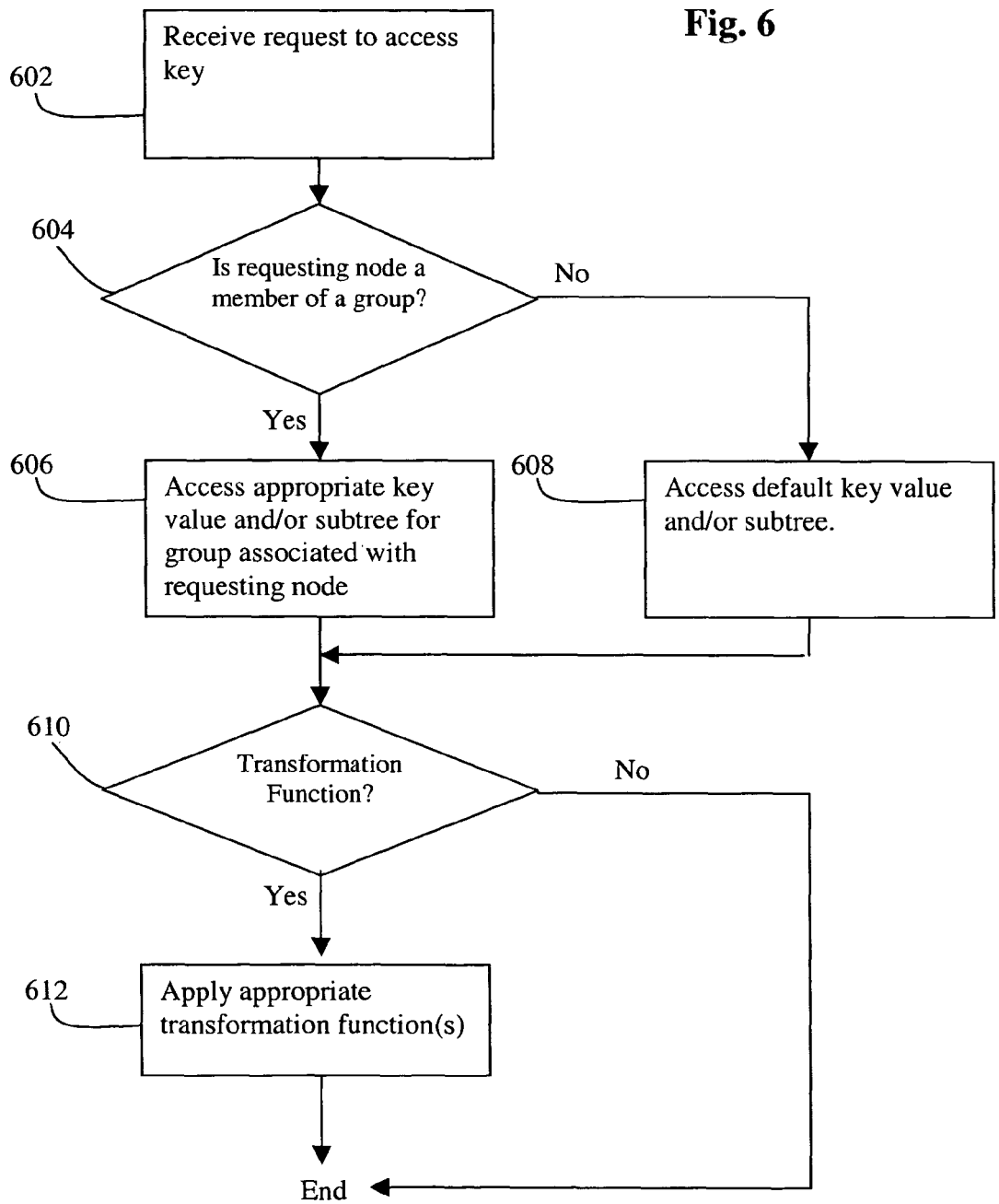
FIG. 6 shows a flowchart of a process for accessing a group dependent key with a data transformation function according to one embodiment of the invention.

FIG. 6 shows a flowchart of a process using implementing data transformation functions according to an embodiment of the invention. A request is received to access a key, e.g., a key that is associated with a group dependent link or group dependent key (602). For example, a request may be issued to read or modify the value of the key. The request may also seek to access a value at a subtree to the key.

A determination is made to identify whether the requesting node is a member of an group associated with a group dependent link or group dependent key (604). As is evident to those skilled in the art, any number of structures may be utilized to track the membership and values for group dependent links. For example, relational database tables may be used to track the group dependent links, group memberships, and links to storage locations for different key values, with such information stored within various columns within the relational database tables. These structures may be searched to identify the specific group, if any, that is associated with the requesting node, as well as the key value or a link to the storage location containing the key value.

If the requesting member belongs to a group that is associated with a group dependent link or group dependent key, then the process accesses, via the GDL or GDK, to the appropriate key value and/or subtree for the group associated with the requesting member (606). If the data access request is to modify the key value, then the value at the appropriate storage location is modified pursuant to the request.

If the requesting node is not a member of a group, then the process accesses the default key value and/or subtree (608). If the data access request is to modify the key value, then the value at the appropriate storage location for the default value is modified pursuant to the request.

At 610, a determination is made whether one or more DTFs are associated with the key value that has been accessed or changed. Alternatively, the DTF may be associated with other structures or entities related to the data, such as the GDL, GDK, or group identifier, and 610 identifies whether one or more DTFs are associated with these other structures or entities. If one or more associated DTF(s) are identified, then the DTF(s) are applied to transform the data and make corresponding changes to related group values (612).

The DTFs can be applied at various points when accessing data. For example, a determination can be made whether to apply the DTFs during update operations of the data or during read operations of the data. Depending on resource availability considerations, such as available memory, processing power, disk space etc., an appropriate optimization strategy can be adopted by a specific implementation of the DTFs.

Therefore, this aspect of the present embodiment allows dynamic and seamless changes to shared data, even when the shared data is viewed in a group or member-dependent manner in which the format, structure, and/or location of the data may differ from member to member.

The following is example BNF grammar that defines a language for implementing DTFs according to an embodiment of the invention:

```
Start : '[' MAP_LIST '{' PROPERTY_LIST '}' ']'
     ;
MAP_LIST :   MAP |
             MAP MAP_LIST
     ;
MAP: '(' G1 '<' DATA ';' G2 '>' DATA','
transform_func '_' G1 '_' G2 '(' ')' ')'
     ;
PROPERTY_LIST :   PROPERTY_NAME
                | PROPERTY_NAME ',' PROPERTY_LIST
     ;
PROPERTY_NAME :  number 'value'|'security'
     ;
G1 : GROUP_NAME
     ;
G2 : GROUP_NAME
     ;
GROUP_NAME : string_or_number
     ;
DATA :  NULL |
        KEY |
        KEY_PROPERTY
     ;
KEY :   key_name |
        key_name ',' KEY
        | key_name '.' '*'
     ;
KEY_PROPERTY : KEY '_' PROPERTY_NAME
     ;
key_name :  string_or_number |
            string_or_number '.' key_name
     ;
string_or_number :  STRING |
                    NUMBER |
                    STRING string_or_number |
                    NUMBER string_or_number
     ;
```

The present document will now provide examples of transformations and corresponding DTFs. For the following examples, consider a key a.b for a GDK. The DTFs are in '[' ']' and they follow the grammar as set forth above.

EXAMPLE 1

The first example involves three groups (Group 1, Group 2, and Group 3), and parallels the example configuration shown in FIG. 5G:

Group1 a.b.c[V1]—Key name is a.b.c and the value of this key is V1

Group 2 a.b.c[V1+8]—Key name is a.b.c and the value of this key is V1+8

Group 3 a.b.c[V1+4]—Key name is a.b.c and the value of this key is V1+4

The following DTF describes the transformation functions between different groups for this key-value:

[(Group1<a.b.c_value; Group2>a.b.c_value, transform1_Group1_Group2( ))

(Group3<a.b.c_value; Group2>a.b.c_value, transform2_Group3_Group2( ))

(Group3<a.b.c_value; Group1>a.b.c_value, transform3_Group3_Group1( ))]

The '_value' signifies that the transformation is to be applied on the value of the key. Keys have values and other attributes (properties) like security attributes etc. Our claim can be extended to include any number of attributes keys may have in some implementation.

EXAMPLE 2

The second example involves two groups in which the transformation is affected by the hierarchical nature of one or more of the data elements/structures:

Group1 a.b.c[V1] a.b.d[V2]

Group2 a.b.f[V1+V2]

[(Group1<a.b.*_value; Group2>a.b.f_value, transform1_Group1_Group2( ))]

In this example, '*' is a syntactic element of the language describing the GDKs. Mention of a.b.* in the above DTF signifies that the transformation is applied on all the children of key a.b.

EXAMPLE 3

The third example shows an approach that addresses the situation when the different groups are associated with shared data having different hierarchical structures.

Group1 a.b.c a.b.d

Group 2 a.b.c

[(Group1<a.b.d; Group2>NULL, transform1_Group1_Group2( ))]

In this example, the key a.b.d does not exist for Group2.

EXAMPLE 4

The next example combines approaches shown in Example 2 and Example 3:

Group1 a.b.c.x[V1] a.b.c.y[V2] a.b.c.z[V3]

Group 2 a.b.c[V1*V2*V3]

[(Group1<a.b.c.*_value; Group2>a.b.c_value, transform1_Group1_Group2( ))]

EXAMPLE 5

In this example, key a is a GDK and it does not exist for Group2, it only exists for Group1:

Group1 a.b.c

Group 2

[(Group1<a.*; Group2>NULL, transform1_Group1_Group2( ))]

EXAMPLE 6

For this example, consider the following groups:

Group1 a.b.c(RWX)—RWX are security attributes of the key. Each of the letters

Group 2 a.b.c(R—)

'R', 'W', 'X' signifiy certain privileges that are granted to certain categories of users. The security attribute can have any arbitrary form in different implementations. This is just an illustrative example.

For Group2 the key a.b.c does not grant any privilege to two of the three categories of users.

[(Group1<a.b.c_security; Group2>a.b.c_security, transform1_Group1_Group2( ))]

In general, group dependent keys and group dependent links are formed because of a common attribute between members of that group. Each group has a "basis", which could constitute any criteria that differentiates one group from another. Therefore, the concept of a group dependent key can be extended to data models not necessarily hierarchical in nature, and in fact, to data that does not necessarily involve a "key". For example, it can be considered for having group dependent views of relational data. The group dependent key structure would be used to allow specific members of associated groups to see only those views associated with their groups. The concept of transformation function can also be extended to such data models.

EXAMPLE APPLICATIONS

There are numerous applications for GDKs and GDLs. For example, these mechanisms can be applied to address incompatibility problems during rolling upgrades of computing applications. A "rolling upgrade" refers to the process of performing software upgrades to a live existing software installation in a distributed environment in which the individual instances, nodes, or entities of the distributed system (referred to herein as "members") are upgraded in a staggered manner. This form of upgrade ensures availability of the application during software upgrades, and thus minimizes or eliminates planned downtime while contributing to high availability goals.

During a rolling upgrade, many types of data may undergo change including member private data, static shared data, and dynamic shared data. According to one embodiment of the invention, incompatibilities to member private data is managed using GDKs, static shared data are managed using GDLs, and dynamic shared data are managed using a combination of GDLs with data transformation functions.

Numerous other applications can be enhanced by using group dependent keys. As another example, consider a website that may be accessed by different classes of users. Customized sets of data can be displayed to the users based upon the specific group to which they are assigned. Examples of such classifications could include, for example, demographic differences (e.g., age, income, geographic region), technical differences (e.g., computer platform, operating system, browser type), access intentions (e.g., business, educational, game playing), etc. In addition, when DTFs are employed, dynamic accesses and updates to data can be made, even if the different sets of data are incompatible with each other. With the present embodiment, group existence and group memberships can also be dynamically changed without affecting this type of access.

Illustrative Example of Group Dependent Key

The present section describes one illustrative embodiment of an approach for implementing group dependent keys and member dependent keys. As noted above, a member dependent key can be implemented as a group dependent key with an associated group having only a single member. This can also be rephrased as stating that a group dependent key can be formed when multiple members are associated to the same member dependent key. As such, the following description may at times use the term "member" or "group" in a interchangeable manner when describing detailed technical details, but are not intended to indicate that the technique is limited or excludes one or the other of group dependent keys or member dependent keys.

Described here are techniques for creating member or group private data in a global namespace. First data that is associated with a key is stored in a repository that is shared by multiple members of a distributed system. After the first data has been stored, second data that is associated with the key is stored without overwriting the first data. Mapping data is stored. The mapping data maps the key, relative to one or more first members of the distributed system, to a first data structure that stores the first data. The mapping data also maps the key, relative to one or more second members of the distributed system, to a second data structure that stores the second data. Based on the mapping data, the first member is allowed to access the first data and not the second data. Based on the mapping data, the second member is allowed to access the second data and not the first data. The first data and the second data may include key values and subtrees of child keys. While reference is made above to first and second members, the techniques disclosed herein may be applied to a greater number of members.

Multiple members may access a particular key that is contained in the mapping. Through the mapping, data (which may include, for example, a single value or an entire subtree of name-value pairs) that is obtained by a member as a result of accessing the key is dependent upon which member accessed the particular key. In other words, multiple members may share a global namespace while maintaining their member private data.

As a result, two different instances of a same computer program, which are running as two different members of a distributed system, and which are designed to read and update values associated with a same key, need not be modified to avoid data conflicts. One instance may refer to the key and obtain a first value that is associated with that instance, and another instance may refer to the same key and obtain a second value that is associated with that other instance. Similarly, one instance may update a first value that is associated with the key, while a second value, that is associated with the same key and with another instance, remains unaffected. Similarly, given multiple instances where each instance is running as a different member of a distributed system, each instance may update a value that is associated with a key, while other values, that are associated with the same key and with other instances, remain unaffected.

While reference is made herein to a single key referencing different single values, the techniques described herein may also be applied to a single key referencing different structures that each include multiple values. For example, the techniques described herein may be applied to produce a single key that references two different hierarchies, or subtrees, of key-value pairs. Thus, according to one embodiment, a whole subtree of key-value pairs may be made private to a given member.

Additionally, structures are disclosed for efficiently storing and accessing key-value pairs that implement public keys and private data as described above. Such efficient structures may be established on a persistent storage device. These structures are described below, first generally, and then with reference to the specific manner in which these structures implement private member data in a global namespace. The structures described below are described for the sake of context, and are not intended to represent an exclusive means of implementing the mapping described above.

According to one embodiment, a storage device may have stored thereon several "registry pages." A registry page is a defined data storage space on a data storage device. Each registry page is of some specified size. For example, each registry page may be 4 kilobytes long.

Taken together, multiple registry pages form a tree structure comprised of nodes. Nodes in the tree structure are data structures that are referred to herein as "tree nodes" or "t-nodes." Each of the registry pages stores a t-node. However, t-nodes need not be stored contiguously. Each t-node corresponds to a key in a hierarchy of keys (which has the same organization as the tree structure). A first of the registry pages is a root t-node of the tree structure.

Figure 7A:
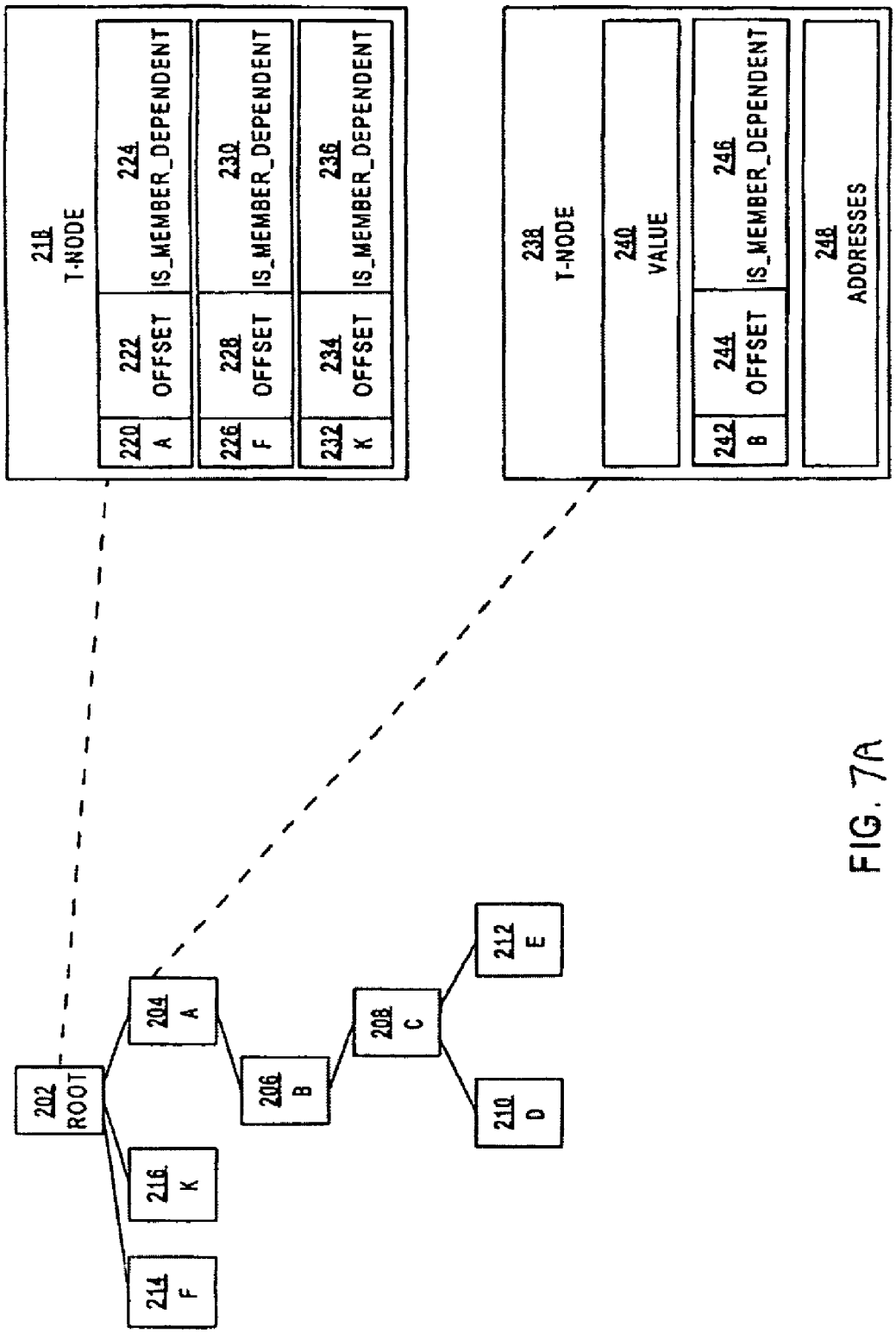
FIG. 7A is a block diagram that shows an example of a hierarchical data structure with associated t-nodes, according to one embodiment.

FIG. 7A is a block diagram that shows an example of a hierarchical data structure with associated t-nodes, according to one embodiment. The hierarchical data structure is a tree of keys. Keys may be parents of, and children of, other keys. For example, key "A" 204 is referred to as a parent key of key "B" 206. Likewise, key "B" 206 is referred to as a child key of key "A" 204.

Each key may be associated with a value. For example, key "A" 204 may be associated with a value "1". Key "B" 206 may be associated with a value "2". Key "C" 208 may be associated with a value "3". Key "D" 210 may be associated with a value "4". Key "E" 212 may be associated with a value "5".

The tree includes a root key 202. Root key 202 may be invisible to the users of the distributed system. In other words, root key 202 is hidden and is not made visible to the users of the distributed system. In this example, root key 202 is a parent key of key "A" 204, key "F" 214, and key "K" 216. When a particular key is created without an explicit designation of a parent key of the particular key, the parent key of the particular key is implicitly designated to be the root key.

Each key is associated with a t-node. Each t-node is located at a particular location (i.e., offset) on a storage device. The location of a t-node that is associated with a particular key is stored in a t-node that is associated with a parent key of the particular key.

In this example, root key 202 is associated with a t-node 218. T-node 218 includes information for each t-node that is associated with a child key of root key 202. Because root key 202 is the parent key of key "A" 204, key "F" 214, and key "K" 216, t-node 202 includes information for t-nodes associated with each of key "A" 204, key "F" 214, and key "K" 216. Information for a t-node associated with a particular key is called a "key component entry" for the particular key.

According to one embodiment, each dot-separated name inside a full key path name is called a key component. For each key component there is a corresponding key component entry. Key component entries are variable in size to take into account widely different size of key names. In one embodiment, up to 255 characters are allowed for each key component, and up to 255 bytes are reserved for each key component name. In one embodiment, a key component name is one or more characters. A key component entry includes a name of the key component and, in one embodiment, a 5 byte logical address of a registry page that stores a t-node that is associated with the key. Of these 5 bytes, the first byte may be used to indicate whether the key is a group or member-dependent key. If the key is a group or member-dependent key, then a logical-to-physical address mapping may be obtained from a "member-dependent key map", which is described in greater detail below. To facilitate the present description, the term "member-dependent" is used even though the same technique may be applied to implement group-dependent keys. The logical address obtained may be a number that is used as an index in the member-dependent key map.

A key component entry for key "A" 204 includes a key component name ("A") 220, an offset 222, and other fields. These other fields include a field is_member_dependent 224. Similarly, a key component entry for key "F" 214 includes a key component name ("F") 226, an offset 228, and other fields, including a field is_member_dependent 230. Likewise, a key component entry for key "K" 216 includes a key component name ("K") 232, an offset 234, and other fields, including a field is_member_dependent 236. The purpose of the is_member_dependent field is described in greater detail below.

Offset 222 provides the location, on a storage device, of a t-node that is associated with key "A" 204. Similarly, offset 228 provides the location, on the storage device, of a t-node that is associated with key "F" 214. Likewise, offset 234 provides the location, on the storage device, of a t-node that is associated with key "K" 216.

Therefore, offset 222 provides the location of a t-node 238 that is associated with key "A" 204. Each t-node includes the value of the key that corresponds to that t-node. Thus, both data (e.g., value) and metadata (e.g., key name) are encapsulated within the same t-node data structure. T-node 238 includes a value 240 that is the value of key "A" 204. In this example, value 240 is "1". In one embodiment, 256 bytes of a t-node are reserved for the value. In one embodiment, values larger than 256 bytes are not stored within the t-node; instead, such larger values are stored at a location to which the t-node points. A technique for storing larger values using indirection is described in greater detail below.

Like each t-node, t-node 238 includes key component entries for each child key of the key with which t-node 238 is associated. Therefore, t-node 238 includes a key component entry for key "B" 206. This key component entry includes a key component name ("B") 242, an offset 244, and other fields, including a field is_member_dependent 246. Offset 244 provides the location, on the storage device, of a t-node (not shown) that is associated with key "B" 206.

Each t-node may also include version information, an owner identifier, a group identifier, access control information (e.g., for users, groups, and others), a number of links to the t-node (e.g., from other t-nodes), a data type of the value of the key that corresponds to the t-node, a size of the value, a number of child keys of the key, a member number, a time that the t-node was created, a time that the t-node was last modified. The key name of the key does not need to be included in the t-node because the key name may be included in the parent t-node of the t-node. This reduces redundancy and preserves storage resources.

In one embodiment, a t-node layout is organized as follows. The first 4 bytes have registry version information. The next 4 bytes are reserved for an owner identifier. The next 4 bytes are reserved for a group identifier. The next 3 bytes are used for access control information for users, groups, and others. The next 1 byte is used to hold the count of the number of links on the current t-node. Therefore, in one embodiment, the maximum number of links is 255. One byte is reserved to indicate whether the t-node is a member-dependent key. One byte is reserved for a data type of the value of the key that is associated with the t-node. The next 4 bytes are reserved for the size of the value data. The next 4 bytes are reserved for creation time information. The next 4 bytes are reserved for last modification time information. The next 4 bytes are used to hold the number of child keys, or key component entries, of the key that is associated with the t-node. In one embodiment approximately 64,000 child keys may be under each key. The next 256 bytes are used to store the value of the key that is associated with the t-node. As described below, larger values may be stored through indirection. The next 80 (4*20) bytes contain logical addresses of 20 pages (described below) that accommodate up to 80 kilobytes of data through single indirection (described below). The next 4 bytes contain an address of a page that contains double indirect pages (described below) for value data, thus accommodating an additional gigabyte of data. The next 12 bytes, starting at byte offset 378, contain addresses of three pages that contain double indirect addresses (described below) of pages that contain key component entries. The next 100 bytes, beginning at byte offset 390, contain addresses of 25 pages that contain key component entries. The next 110 bytes are reserved for other uses. The rest of the space in the t-node is taken up by key component entries. Each key component entry represents one child key.

In one embodiment, a t-node is allocated to contain within itself, at most, a 256 byte value. It may sometimes be desirable to associate, with a key, a value that is larger than 256 bytes (or whatever limited amount of data storage space has been specified).

Therefore, in one embodiment, a t-node may include one or more addresses. For example, t-node 238 includes addresses 248. Each address may provide the location, on the storage device, of a different page. In one embodiment, each page is a different 4 kilobyte data storage space. Such pages are different than the registry pages discussed above.

The first 256 bytes of a value are stored in the t-node itself. The remainder of the value may be divided into 4 kilobyte portions. Each portion may be stored in a different page. The addresses included in the t-node provide the locations of the pages, which need not be contiguous. So, for example, the first 4 kilobytes after the first 256 bytes of a value may be stored in a first page that is referenced by a first address, the next 4 kilobytes after that may be stored in a second page that is referenced by a second address, and the remainder of the value (which may be less than 4 kilobytes) may be stored in a third page that is referenced by a third address. Because each address refers directly to the location of a page, this technique is called "single indirection."

Because each t-node is limited to some size, a finite number of addresses may be stored in a t-node. In one embodiment, each address is 32 bytes long. Therefore, to store even larger values, each 4 kilobyte page referred to by one of addresses 248 may include one or more other addresses (a 4 kilobyte page may include up to 128 32-byte addresses). Each of these other addresses may, in turn, refer to a different 4 kilobyte page. Each of these different pages may store a different portion of the value. Because each address in the t-node refers to a page that includes addresses that refer to yet other pages, this technique is called "double indirection."

In other embodiments, additional levels of indirection may be used. Consequently, the specified size of a t-node imposes no limit on the size of a value that may be associated with a key.

Indirection may also be used to allow a parent key to have a greater number of child keys. As described above, a t-node contains key component entries for each child key of the key that is associated with the t-node. Because the size of a t-node is limited, a finite number of key component entries may be contained within a given t-node. In one embodiment, addresses contained in the t-node may refer to different pages that store key component entries in addition to those that are stored in the t-node itself. Any level of indirection is possible. Consequently, the specified size of a t-node imposes no limit on the number of keys that may be children of a particular key.

Figure 7B:
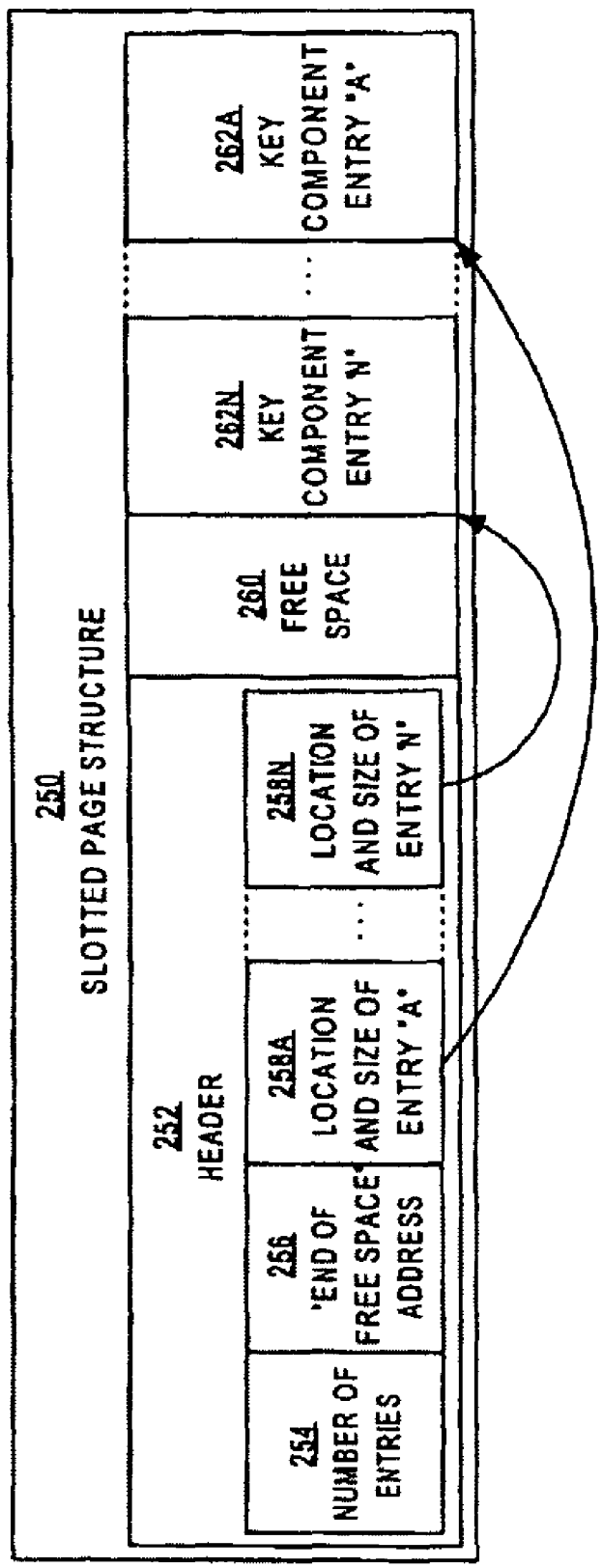
FIG. 7B is a block diagram that illustrates a slotted page structure that may be used to store key component entries, according to one embodiment.

FIG. 7B is a block diagram that illustrates a slotted page structure that may be used to store key component entries, according to one embodiment. In one embodiment, each t-node stores key component entries for the child keys of the key that is associated with that t-node in a slotted page structure that is contained within that t-node. The slotted page structure itself is a data structure that is well known.

Slotted page structure 250 includes a header 252, free space 260, and key component entries 262A-262N. Header 252 includes a number of entries 254. Number of entries 254 contains the number of key component entries that are stored in slotted page structure 250.

Header 252 also includes an "end of free space" address 256. "End of free space" address 256 contains the address at the end of free space 260. It is at this address that new key component entries are added to slotted page structure 260. In one embodiment, "end of free space" address 256 is a two-byte address. In one embodiment, header 252 is located starting at byte offset 600 of a t-node.

Header 252 also includes an array 258A-258N that stores locations and sizes of each of the key component entries 262A-262N that are stored in slotted page structure 250. In array 258A-258N, the location and size of key component entry "A" 262 is indicated by location and size of entry "A" 258A. Likewise, the location and size of key component entry "N" 262N is indicated by location and size entry "N" 258N. Other locations and sizes of other key component entries may similarly by indicated in array 258A-258N.

Located between header 252 and key component entries 262A-262N is free space 260. Free space 260 is a contiguous space that shrinks as key component entries are added to the t-node and grows as key component entries are removed from the t-node.

Key component entries 262A-262N are the key component entries for the child keys of the key that is associated with the t-node. Key component entries are added starting at the end of the slotted page structure, and then towards the start of free space 260 with each new addition.

In one embodiment, when a key component entry is removed from slotted page structure 250, the key component entries closest to free space 260 are relocated so that the space formerly occupied by the removed key component entry is occupied. This relocation essentially "de-fragments" the key component entries, thus ensuring the contiguity of both free space 260 and key component entries 262A-262N.

As noted above, data may be made private to one or more particular member(s) of a distributed system through the creation of a group or member-dependent key. In this embodiment, a member-dependent key is expressly designated as being member-dependent when it is created. A member-dependent key may be created from any member of a distributed system; even a member other than the particular member for whom the data associated with the member-dependent key will be private.

Member-dependent keys are different from keys that are not member-dependent, in that member-dependent keys are expressly designated to be member-dependent keys when they are created. Invoking a special function of an Application Programming Interface (API) causes a member-dependent key to be created. Child keys of a member-dependent key do not need to be expressly designated as member-dependent keys in order to be private to a particular member. When a child key (or grandchild key, great-grandchild key, etc.) of a member-dependent key is created, that child key is automatically made private to the member that created it. This is so even though the member does not expressly designate that child key as a member-dependent key.

In one embodiment, a key component entry for a key includes information that designates that key as being a "member-dependent key." For example, if key "B" 206 was created as a member-dependent key, then the field is_member_dependent 246 would be set to "true" (e.g., "1"). Otherwise, is_member dependent 246 would be set to "false" (e.g., "0").

A key that is designated as being a member-dependent key may reference different values for different members of the distributed system. In other words, the value of a member-dependent key depends on the member from which the key is accessed. In one embodiment, a key component entry for a member-dependent key includes, instead of an offset that provides a location of a t-node, an index value for an entry in a data structure. The data structure that contains the entry is called the "member-dependent key map." The member-dependent key map is described in greater detail below.

Figure 8:
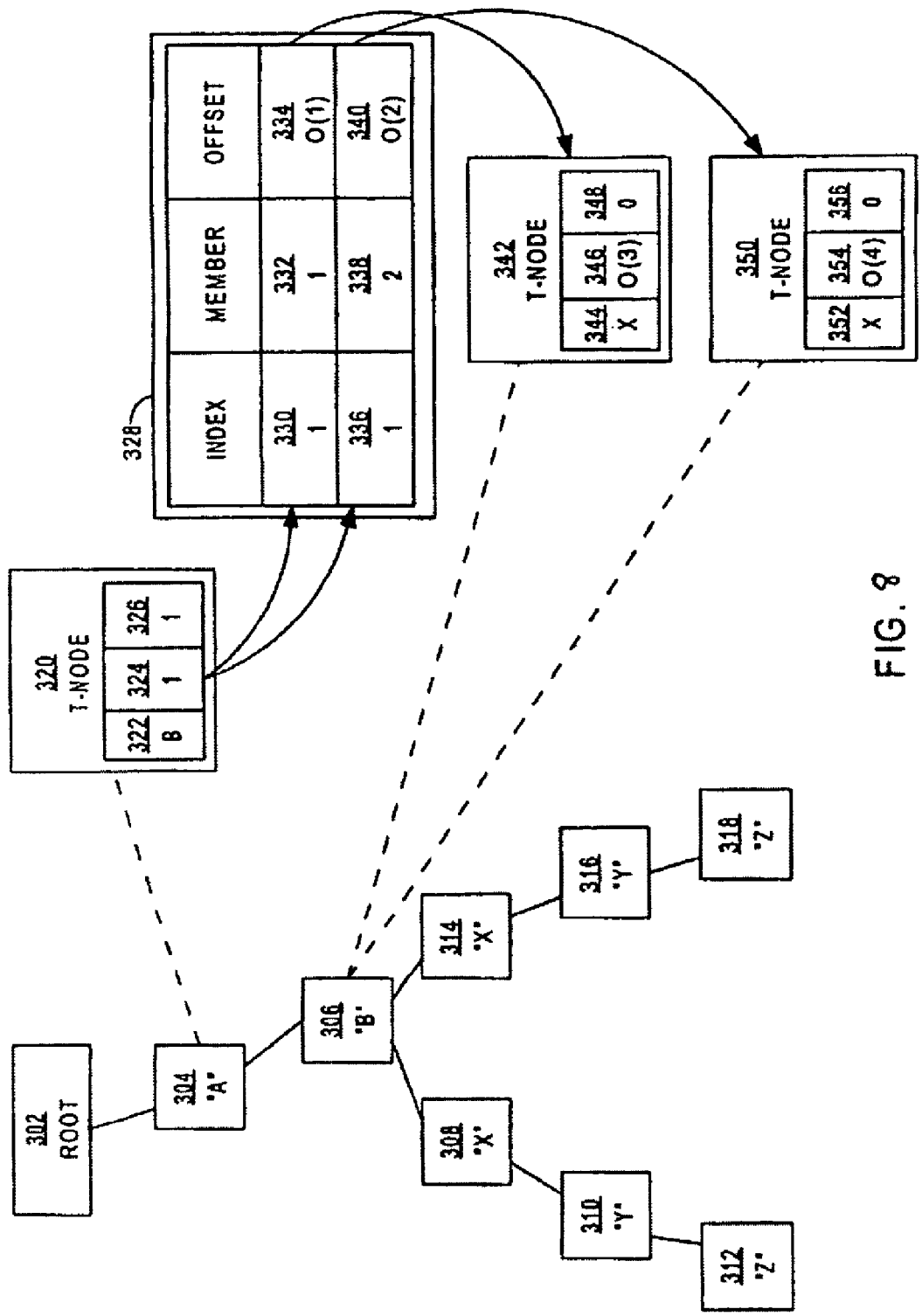
FIG. 8 is a block diagram that illustrates a member-dependent key map, according to one embodiment.

FIG. 8 is a block diagram that illustrates a member-dependent key map, according to one embodiment. In one embodiment, the member-dependent key map is a table 328. Each entry (e.g., row) of the table includes an index value, a member identifier, and an offset that provides a location of a t-node on the physical storage device. For example, one row of table 328 includes an index value 330, a member identifier 332, and an offset 334. Another row of table 336 includes an index value 336, a member identifier 338, and an offset 340. The index value may also be referred to as a "member dependent key number" or "MDK number". Each offset may be a physical page number.

To illustrate the function of table 328, an example hierarchy of keys is also shown. In the example hierarchy, root key 302 is the parent key of key "A" 304. Key "A" is the parent key of key "B" 306. In this example, key "B" 306 has been created as a member-dependent key. As a member dependent-key, key "B" 306 may reference one value relative to one member, and another different value relative to another member.

Also, as a member-dependent key, key "B" 306 is the parent key of both key "X" 308 and key "X" 314. While key "X" 308 and key "X" 314 share a global name space (by virtue of the shared key component name "X"), the value and child keys of key "X" 308 are private to one member, while the value and child keys of key "X" 314 are private to another member.

Key "X" 308 is the parent key of key "Y" 310. Key "Y" is the parent key of key "Z" 312. Key "Y" 310 and key "Z" 312 are private to the same member to which key "X" 308 is private by virtue of being descendant keys of a member-dependent key.

Key "X" 314 is the parent key of key "Y" 316. Key "Y" 316 is the parent key of key "Z" 318. Key "Y" 316 and key "Z"

318 are private to the same member to which key "X" 314 is private by virtue of being descendant keys of a member-dependent key.

Each member-dependent key is associated with a unique index value. The index value of a member-dependent key is included in the member-dependent key's key component entry that is contained in the parent key of the member-dependent key. For example, t-node 320 is associated with key "A" 304, which is the parent key of key "B" 306. Because key "A" 304 is the parent key of key "B" 306, t-node 320 includes a key component entry for key "B" 306.

The key component entry for key "B" 306 includes a key component name ("B") 322. The key component entry for key "B" 306 also includes a field is_member_dependent 326. Because key "B" 306 has been created as a member-dependent key, is_member dependent 326 is set to "1" (e.g., "true"). By is_member dependent 326 being set to "1", it is signified that the value in offset 324 is not actually an offset to a t-node, but that the value in offset 324 is actually an index value used to locate an entry in table 328. In this example, offset (or index value) 324 is set to "1". Thus, in this example, the unique index value associated with key "B" 306, as a member-dependent key, is "1".

In this example, table 328 includes two entries whose index is set to "1"; index value 330 is set to "1" and index value 336 is set to "1". Both of these index values correspond to offset (or index value) 324, which is also set to "1". Associated (i.e., in the same row) with index value 330 is member identifier 332. Associated with index value 336 is member identifier 336. Each member of the distributed system is associated with a unique member identifier. In this example, a member identifier of a first member is "1" and a member identifier of a second member is "2". In one embodiment, when a member-dependent key is created, a different entry for that member-dependent key is created in the member-dependent key map for each member of the distributed system.

The entry that includes member identifier 332 also includes an offset 334. The entry that includes member identifier 338 also includes an offset 340. In this example, offset 334 is shown as "O(1)" and offset 340 is shown as "O(2)". Each of these offsets provides a location to a different t-node that is associated with key "B" 306. Because member identifier 332 ("1") corresponds to offset 334, a member having a member identifier of "1" uses offset 334 to locate a t-node when that member accesses key "B" 306 (which corresponds to index value "1"). Because member identifier 338 ("2") corresponds to offset 340, a member having a member identifier of "2" uses offset 340 to locate a t-node when that member accesses key "B" 306.

T-nodes 342 and 350 are both associated with key "B" 306. T-node 342 is located at the location indicated by offset 334. T-node 350 is located at the location indicated by offset 340. T-node 342 may include a different value and different key component entries than t-node 350.

Thus, a t-node associated a key relative to one member is different than a t-node associated with the same key relative to another member. Because each t-node that is associated with a single member-dependent key includes its own independent key component entries, once a parent key is created as a member-dependent key, all of that parent key's child keys will be member-private even if not explicitly made member-dependent. The key component entries for one t-node may have the same key component names as the key component entries for another t-node.

For example, t-node 342 includes a key component entry that includes a key component name 344 that is set to "X". Similarly, t-node 350 includes a key component entry that includes a key component name 352 that is also set to "X". However, an offset 346 in the key component entry that is included in t-node 342 is different than an offset 354 that is included in t-node Therefore, offset 346 may provide the location ("O(3)") of a t-node that is associated with key "X" 308, while offset 350 may provide the location ("O(4)") of a t-node that is associated with key "X" 314.

The values for key "X" 308 and key "X" 314 may differ. This is so even though key "X" 308 and key "X" 314 were not specially created as member-dependent keys (as demonstrated by is_member_dependent 348 and is_member_dependent 356 both being set to "0"). For example, key "X" 308 could be created as a child key of key "B" 306 from a member whose member identifier is "1", while key "X" 314 could be created as a child key of key "B" 306 from a member whose member identifier is "2". The different members need not even be aware that key "B" 306 is a member-dependent key.

Thus, data may be member-private even though a key name associated with that data is global. As a result, a program does not need to be modified in order for an instance of that program to create and access data that is private and protected from all other instances of that program. Other programs, such as installation programs, may create member-dependent keys for which child keys may be created at a later time.

The member-dependent key is a group-dependent key when the map table 328 is configured to associate multiple members to the same T-node. These multiple members would be members of the same group. In an embodiment, each such member would have its own entry in map table 328 that points to the same offset location. In an alternate embodiment, a single entry in map table 328 contains information about multiple members in the "MEMBER" column. In an embodiment, a separate table can be used to track identifiers or members of different groups. For example, a unique identifier may be associated with each group, e.g., "1" for group 1, "2" for group 2, etc. These identifiers are used in conjunction with the other structures shown in FIG. 8 to track group membership. It is noted that FIG. 8 can alternatively be configured to show multiple different subtrees from "B" node 306, in which each subtree would be different for each group, e.g., "x"-"y"-"z" for a first group, "a"-"b"-"c" for a second group, "d"-"e"-"f" for a third group, etc.

Figure 9:
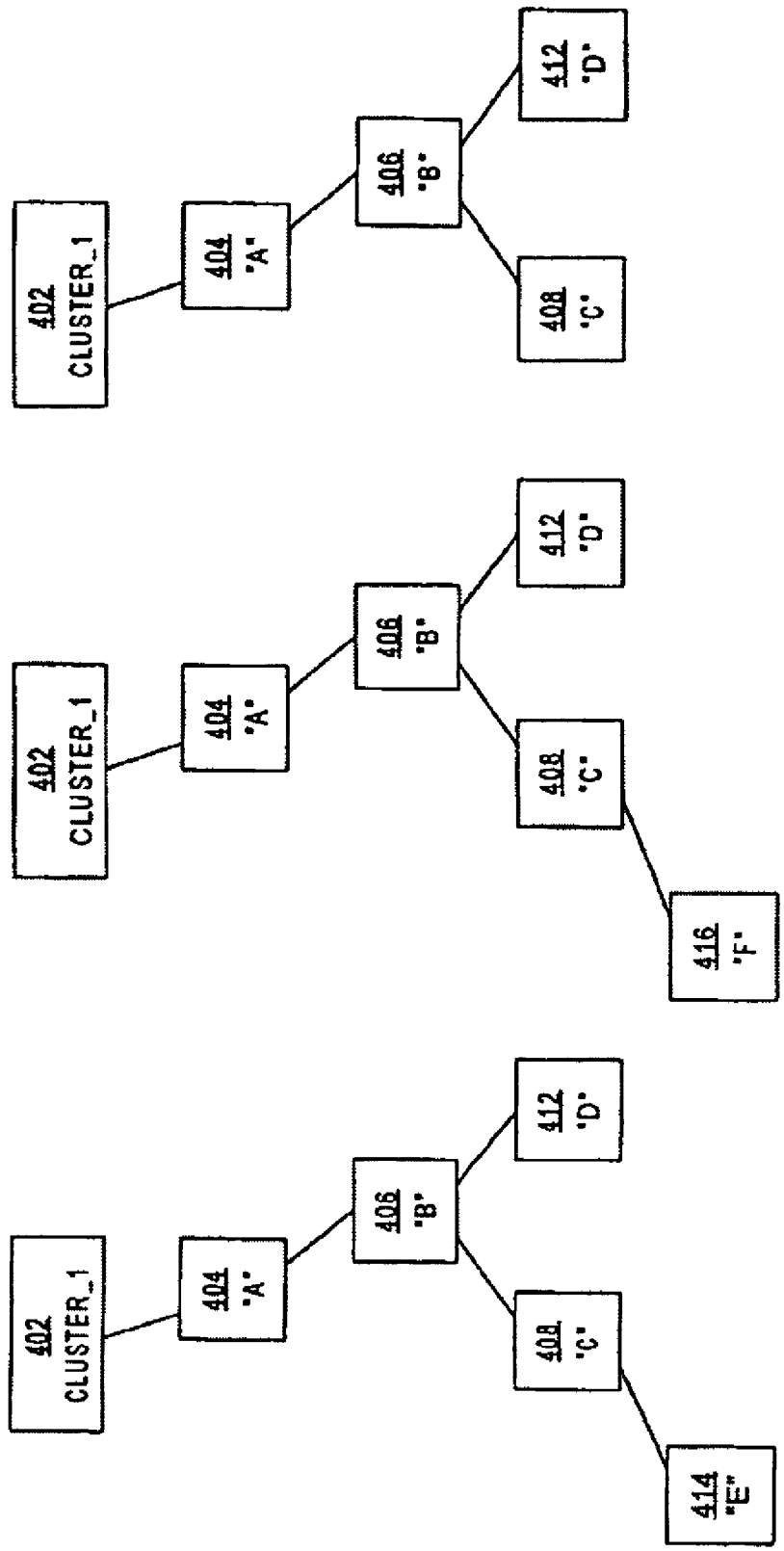
FIGS. 9A, 9B, and 9C are block diagrams that illustrate member-dependent data sub-hierarchies, according to one embodiment.

FIGS. 9A, 9B, and 9C are block diagrams that illustrate member-dependent data sub-hierarchies, according to one embodiment. The hierarchy illustrated in FIG. 9A may be apparent to a first member of a distributed system. The hierarchy illustrated in FIG. 9B may be apparent to a second member of a distributed system. The hierarchy illustrated in FIG. 9C may be apparent to a third member of a distributed system.

Each of the hierarchies illustrated in FIGS. 9A, 9B, and 9C include a key "CLUSTER_1" 402. In each of these hierarchies, a key "A" 404 is a child key of key "CLUSTER_1" 402. In each of these hierarchies, a key "B" 406 is a child key of key "A" 404. In each of these hierarchies, a key "C" 408 and a key "D" 412 are child keys of key "B" 406. All of the first, second, and third members of the distributed system can see and access these keys.

In each of the hierarchies illustrated in FIGS. 9A, 9B, and 9C, key "C" 408 is a member-dependent key. That is, key "C" 408 was expressly created as a member-dependent key. In this example, no other key in the hierarchies was expressly created as a member-dependent key.

In FIG. 9A, a key "E" 414 is a child key of key "C" 408. Only the first member of the distributed system can see and access key "E" 414 and its corresponding value and child keys (if any). In contrast, in FIG. 9B, a key "F" 416 is a child key of key "C" 408. Only the second member of the distributed system can see and access key "F" 416 and is corresponding value and child keys (if any). In further contrast, in FIG. 9C, key "C" 408 has no apparent child keys. Thus, the third member of the distributed system does not see any child keys of key "C" 408. A given member of a distributed system may be access an entire sub-hierarchy that is private to that member.

When a new child key is created under a key, a new t-node may be allocated for the child key. A key component entry may be created for the child key. The key component entry may be entered into the t-node of the parent key. If intermediate child keys do not exist, then the intermediate child keys may be created as a side-effect of the creation of the new child key. For example, if a child key named "a.b.c.d" is to be created, and only "a.b" currently exists, then "a.b.c" and "a.b.c.d" are both created. Any of the intermediate child keys could be a member-dependent key.

If an intermediate child key is a member-dependent key, then all of that intermediate child key's descendant keys are member-private. If an intermediate child key is a link to another key, then the t-node address field may point to a t-node for the other key. Thus, in one embodiment, multiple key component entries may share a single t-node.

In one embodiment, to create a new key, user access control information, a key handle of a parent key of the new key, a key name of the new key, and security attributes of the new key are provided to a function. The function finds a part of the provided key name that is not common with the name of the key that is stored in the provided key handle. The function stores that part in the new key. For example, if the key name of the key handle contains "a.b.c", and the provided key name is "a.b.c.d.e", then the part stored in the new key is "d.e".

The function assigns the key handle to a temporary key handle. For each component in the new key, the function does the following. The function finds a t-node that corresponds to the parent key using the temporary key handle. The function finds a t-node that corresponds to the key component. If the t-node that corresponds to the key component already exists, then the function assigns the t-node that corresponds to the key component to the temporary key handle.

If the t-node that corresponds to the key component does not already exist, then the function creates a key component entry in memory for the key component.

The function allocates a new t-node for the key component and inserts the address of the new t-node into the address field of the key component entry. The function may call another function to enter the key component entry into a t-node. The function assigns the handle of the newly created key to the temporary key handle.

After the function has done the above for each component in the new key, the function may call another function to finish "shadow updating" of a list of free registry pages. The function marks the log space as being invalid. The function returns the key handle that is currently stored in the temporary key handle.

In one embodiment, to find a key component entry in a t-node, a key name and a t-node address are provided to a function. The function searches through the slotted page structure of the t-node at the address provided to the function. Using the array in the header of the slotted page structure, the function locates and reads key component entries. If the key name stored in a key component entry matches the key name provided to the function, then the function returns the address of the t-node and the offset of the key component entry that stores the matching key name. The function may also return a size of the key component entry that stores the matching key name.

If the key component entry that stores the key name is a key component entry for a member dependent key, then the address of the t-node may be obtained from the member dependent key map, as described above.

If the function does not find the key name provided to the function in any of the key component entries in the slotted page structure, then the function searches directly addressed registry pages for the key name. If the function finds the key name, then the function returns the address of the t-node and the offset of the key component entry that stores the matching key name. The function may also return a size of the key component entry that stores the matching key name.

If the function does not find the key name provided to the function in any of the directly addressed registry pages, then the function searches indirectly addressed registry pages for the key name. If the key name is found, then the function returns the address of the t-node and the offset of the key component entry that stores the matching key name. The function may also return a size of the key component entry that stores the matching key name.

If the function does not find the key name in the slotted page structure or in the directly or indirectly addressed pages, then the function may return an error message.

In one embodiment, to create a new key component entry in a t-node, a key component entry and a t-node address are provided to a function. Based on the t-node address, the function finds the registry page in which the key component entry is to be created. If there is not enough space to create the key component entry in the registry page, then another function is called to find a free page.

If there is enough space to create the key component entry in the registry page, then the function does the following. The function writes the t-node (at the address provided) into a log space. The function updates a count of key component entries that are in that t-node. The function sequentially scans through the header of the slotted page structure of the t-node to find the first empty entry. If there are no empty entries in the header, then the function creates a new entry at the end of the array that is in the header.

Once the function has found or created an empty entry, the function writes the key component entry provided to the function at the end of the free space in the slotted page structure. The function inserts size and location information of the new key component entry in a corresponding entry in the array in the header of the slotted page structure. Another function may be called to finish "shadow updating" of a list of free registry pages.

If there is not enough space to create the key component entry in the registry page, then the function does the following. The function initializes a new registry page with the slotted page structure. The function then performs the techniques described above, but in relation to the new registry page.

Whether or not there is enough free space to create the key component entry in the registry page, the log space mentioned above is marked as being invalid. The function returns an indication of success or failure based on whether the new key component entry was created.

In one embodiment, to delete a key component entry from a t-node, a key name is provided to a function. The function finds a t-node that stores the key component entry that stores the provided key name by calling the function described below to find a t-node in which a key component entry for a key exists. The function decrements a count of key component entries in the t-node found. The function finds the key component entry that stores the provided key name by calling the function described above for finding a key component entry in a t-node. The function makes an entry in a registry page log and writes the t-node's registry page into the registry page log space. The function deletes the key component entry that stores the provided key name from the slotted page structure. Another function may be called to finish "shadow updating" of a list of free registry pages. The function marks the log space as being invalid. The function returns an indication of success or failure based on whether the key component entry was deleted.

In one embodiment, to find a t-node in which a key component entry for a key exists, a key name is provided to a function. The function parses the key name to separate the key components of the provided key name. The function reads the root registry page. For each of the key components of the provided key name, the function does the following.

The function finds the key component entry for the key component by calling the function described above to find a key component entry in a t-node. If the function cannot find the t-node, then the function may return an error. Otherwise, the function reads the t-node that was found.

After doing the above for each of the key components of the provided key name, the function returns the t-node that was most recently read (i.e., the current t-node).

In one embodiment, to set a value of an empty t-node, a value and a t-node are provided to a function. The function may return an error if the size of the value is greater than a maximum permitted value size. Otherwise, the function scans through a list of free registry pages to find the total size of the available free space. The function may return an error if the size of the free space is less than the size of the value.

Otherwise, the function makes an entry for the operation in the registry page log space. The function writes the t-node into the registry page log space. The function writes the size of the value in a field of the t-node that is reserved for the size of the value. In one embodiment, the function writes the first 256 bytes of the value in the field of the t-node that is reserved for the value. If the size of the value is 256 bytes or less, then the function returns an indication that the operation was successful.

Otherwise, based on the size of the value, the function allocates direct and possibly indirect pages (if the value is sufficiently large) for the value by updating the t-node and the list of free registry pages. The function writes the value in the allocated pages. If any error occurs while writing, then the function may return an error. Otherwise, another function may be called to finish "shadow updating" of the list of free registry pages. The function marks the log space as being invalid. The function returns an indication of success or failure based on whether the value was stored.

In one embodiment, to modify a value of a t-node, a new value and a t-node are provided to a function. If the size of the new value exceeds a maximum permitted size, then the function may return an error. Otherwise, the function scans through a list of free registry pages to find a total size of free space available. The function reads the t-node to find the current size of the existing (old) value. If the sum of the total available free space and the current size of the existing value is not greater than the size of the new value, then the function may return an error.

Otherwise, the function makes an entry for the operation in the registry page log space. The function writes the t-node into the registry page log space. The function writes the size of the new value in the field of the t-node that is reserved for the value of the t-node. If the size of the new value is small enough so that one or more registry pages can be freed, then the function writes those one or more registry pages into the registry page log space and modifies the list of free registry pages.

Regardless of whether the function modifies the list of free registry pages, in one embodiment, the function writes the first 256 bytes of the new value in the field reserved for the value in the t-node. If the size of the new value is 256 bytes or less, then the function returns an indication of success. Otherwise, if the size of the new value is greater than the size of the existing value and new registry pages should be acquired to store the new value, then the function calls another function to find a free page. The function writes the new value in the pages allocated.

If any error occurs while writing, then the function may return an error. Otherwise, the function may call another function to finish "shadow updating" of the list of free registry pages. The function marks the log space as being invalid. The function returns an indication of success or failure based on whether the value was stored.

In one embodiment, to open a key, user access control information and a key name are provided to a function. The function searches for a t-node that stores the key name, possibly by calling another function that is designed to find a t-node. If the key does not exist, or if access to the key is not permitted based on the user access control information, then the function may return an error.

Otherwise, the function inserts a key component entry for the key into a key handle. The function inserts security attributes for the key into the key handle. The function then returns the key handle.

In one embodiment, to read the value a key, user access control information, a key handle (such as may be returned by the function for opening a key, as described above), an address of a buffer in which a read value is to be stored, and an address at which a size of the buffer is stored are provided to a function. The function obtains an address of a t-node based on the provided key handle. If the provided size of the buffer is zero, then the function may return an error.

Otherwise, the function reads user security attributes from the provided user access control information. The function reads key security attributes from the provided key handle. The function checks if the user indicated in the user access control information has sufficient privileges to access the key by calling another function. If the check is not successful, then the function may return an error.

Otherwise, the function reads the t-node from a disk into memory. The function reads the size of the value that is stored in the t-node. If the size of the value is greater than the provided size of the buffer, then the function may insert the size of the data at the address where the size of the buffer was stored, and return an error.

Otherwise, in one embodiment, the function reads the first 256 bytes of the value from the field in the t-node that stores the value. The function stores this at the address of the buffer provided. If the size of the value is more than 256 bytes, then the function reads directly addressed pages. The function appends the information read from the directly addressed pages to the data that is stored in the provided buffer. The function does not stop reading the directly addressed pages until the entire value has been read. The function inserts the total number of bytes read at the address where the size of the buffer was stored. The function may return an indication of success.

In one embodiment, to create a new key and set the value of the new key, user access control information, a function may call another function to create a key, such as is described above. However, shadow updating is not finished, and the registry page log is not marked as being invalid. After the key is created, the function may set the value of the new key by calling another function to set the value of a key, such as is described below.

In one embodiment, to create a link, user access control information, a key handle of an open destination key, a key name of a source key, and security attributes of the source key are provided to a function. The function reads a t-node of the destination key using an address that is located in the provided key handle of the destination key. This t-node may be referred to as the destination t-node.

If the number of existing links on the key exceeds some specified threshold, then the function may return an error. If the destination key is a member-dependent key and the source key is not a member-dependent key, or vice-versa, then the function may return an error.

Otherwise, the function creates an image of the destination t-node in the registry page log. The function updates a link count of the destination t-node. The function finds a t-node that corresponds to a parent key of the source key (whose key name was provided). This t-node may be referred to as the source t-node. The function creates, in memory, a key component entry for the provided key name. The function inserts the address of the destination t-node into a t-node address field of the key component entry. The function enters the key component entry into the source t-node. The function deletes log records that were involved in the operation. The function may call another function to finish "shadow updating" if needed. The function returns a key handle.

In one embodiment, to create a new member-dependent key, user access control information, a key handle of a parent key of the new key, a key name of the new key, and security attributes of the new key are provided to a function. The function performs the same operations as those described above, except that, by setting a bit in the key component entry for the key stored in the parent t-node, the function creates a new entry for the member-dependent key to be created in the member-dependent key map. The function enters the address of the newly created entry in the member-dependent key map inside the key component entry of the key. The function allocates a t-node for the key for each of the members (one t-node for each member) and writes the addresses of these t-nodes in the entry corresponding to the key in the member-dependent key map.

In one embodiment, to set a security attribute of a key, user access control information, a key handle of an opened key, and new security attributes for the opened key are provided to a function. If the user identified by the user access control information does not have sufficient privileges to access the key, then the function may return an error.

Otherwise, the function reads a t-node that corresponds to the provided key handle. The function creates a record of the t-node in the registry page log. The function updates the t-node in memory and then writes the t-node to the disk. The function marks the registry page log as being invalid.

In one embodiment, to set a value of a key, user access control information, a key handle of an opened key, a pointer to a buffer that contains the new value, a type of the new value, and the size of the new value are provided to a function. If the user identified by the user access control information does not have sufficient privileges to access the key, then the function may return an error. If the provided size of the new value is equal to zero, then the function may return an error.

Otherwise, the function retrieves the t-node that corresponds to the provided key handle. The t-node may be a member-dependent key or not; the address of the t-node may be obtained by a previously called function, such as the function described above with reference to opening a key. The function may use another function, such as described above to modify the value of the retrieved t-node. If this other function returns an error, then the error is passed along.

Otherwise, the function may mark the registry page log as being invalid and return an indication of success.

In one embodiment, to delete a value of a key, user access control information and a key handle of an opened key are provided to a function. If the key component entry for the key is already empty (e.g., signified by the t-node's address being equal to 0x0000), then the function may return an error.

Otherwise, the function reads the t-node for the key. The function writes, in the registry page log space, the value of each registry page that contains the value of the key. The function creates a shadow of a list of free registry pages, possibly by calling another function designed to create such a shadow. The function updates the shadow by marking every registry page that contains the value of the key as being a free registry page. The function writes t-node for the key into the registry page log space. The function updates the t-node by making the value field of the t-node empty, making the value size of the t-node zero, and marking direct and indirect addresses in the t-node as being empty.

If the key is a member-dependent key, then the function does the following. The function creates a shadow of the member-dependent key map, possibly by calling another function designed to create a shadow of the member-dependent key map. The function deletes an entry, in the shadow of the member-dependent key map, which corresponds to the t-node.

Regardless of whether the key is a member-dependent key, the function may call another function to finish "shadow updating" of data structures. The function marks the log space as being invalid.

In one embodiment, to delete a key, user access control information and a key handle of an opened key are provided to a function. If the key component entry for the key is already empty (e.g., signified by the t-node's address being equal to 0x0000), or if the key has child keys, then the function may return an error.

Otherwise, the function reads a t-node from a disk by using the address of the t-node that is stored in the key component entry that is stored in the provided key handle. If the value size for the key is not equal to zero, then the function may return an error. If the count of the total number of key component entries is not equal to zero, then the function may return an error.

If the function does not return an error, then the function does the following. The function locates, on the disk, a registry page that contains the key component entry for the key. The function reads the located registry page into memory. The function writes the registry page into the registry log space, possibly by calling another function that writes to the registry log space. The function deletes the key component entry in the registry page that is stored in memory by calling another function, such as described above. The function may call another function to finish "shadow updating" of data structures. The function marks the log space as being invalid. The function may return an indication of success.

A key handle of an opened key is provided to a function. If the opened key is already a member-dependent key, then an error may be thrown. Otherwise, the function locates the t-node for the key and the key component entry (KCE) corresponding to the key (The KCE is located in the parent t-node of the key). The function sets a bit in the KCE to indicate that it is a member-dependent key. The function then makes as many replicas of the t-node for the key as there are members in the distributed system. The function creates a new entry for the key in the member-dependent key map and inserts the index of this entry in the key component entry corresponding to the key. The function inserts the addresses of the t-nodes into the entry for the key in the member-dependent key map. The member number indexes each t-node address.

A key handle of an opened member-dependent key is passed to a function. If any of the ancestors of the key is also a member-dependent key, then an error may be thrown. The function locates the key component entry for the key. The function then locates the member-dependent key map entry for the key (the index of the member-dependent key map entry for the key is read from the key component entry for the key). The function then locates the t-nodes for the key corresponding to the members of the distributed system (there are as many t-nodes for a member-dependent key as there are members of the distributed system). The function deletes the t-nodes and all the descendants of each corresponding to all the members of the distributed system except the current member. The function then marks the bit in the key component entry for the key to indicate that the key is a normal key. The function inserts the address of the t-node for the key corresponding to the current member of the distributed system in the key component entry for the key.

Figure 10:
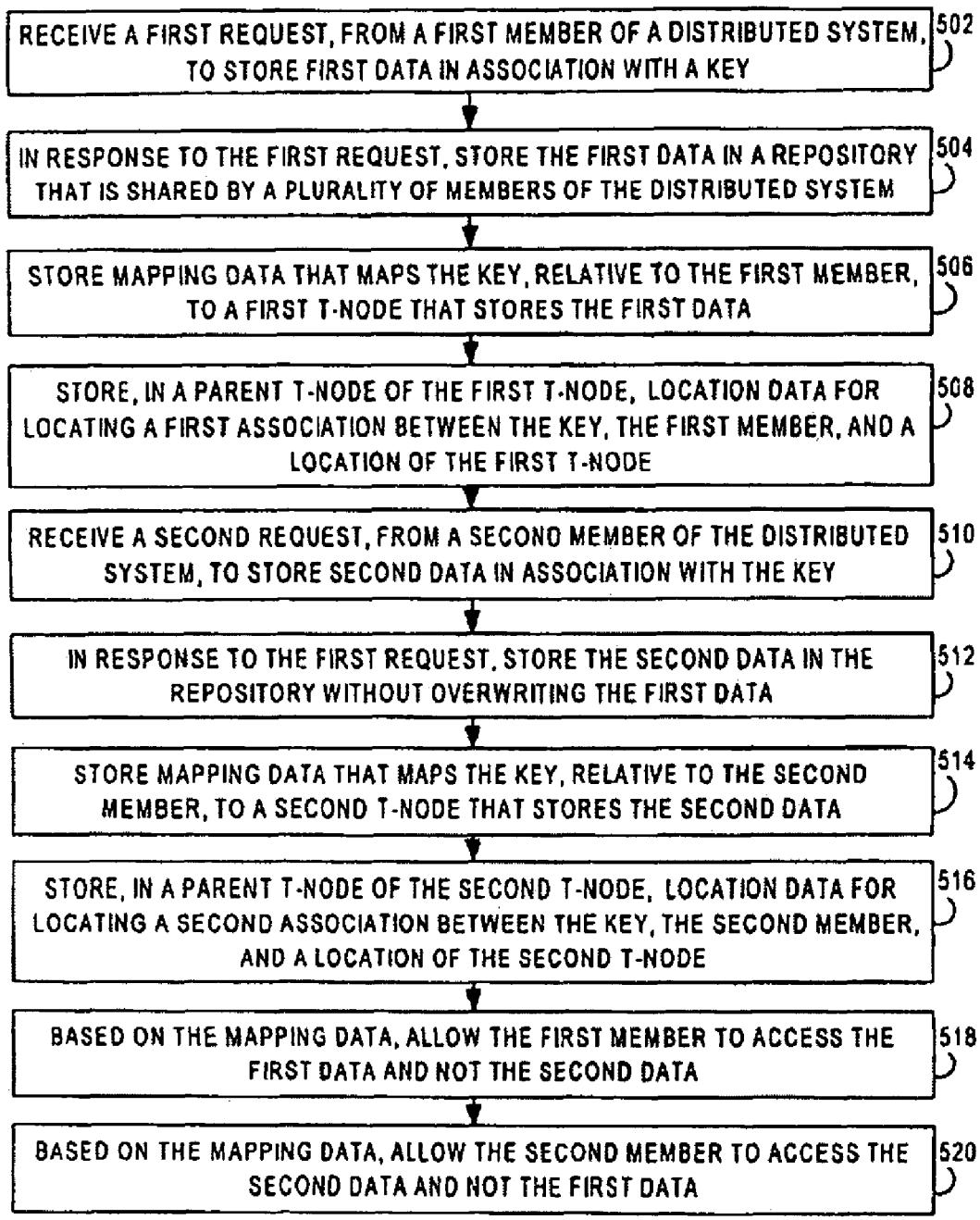
FIG. 10 is a flow diagram that illustrates a technique for creating member private data in a global namespace, according to one embodiment.

FIG. 10 is a flow diagram that illustrates a technique for creating member private data in a global namespace, according to one embodiment. In block 502, a first request is received from a first member of a distributed system to store first data in association with a key.

In block 504, in response to the first request, the first data is stored in a repository that is shared by a plurality of members of the distributed system. The repository may store configuration information that is used by both a first instance of a computer program that runs as a first member of the distributed system and a second instance of the computer program that runs as a second member of the distributed system. The repository may store configuration information that is used by multiple instances of a computer program that run on a same hardware element of a distributed system In block 506, mapping data is stored. The mapping data maps the key, relative to the first member, to a first t-node that stores the first data. The mapping data may be stored in a member-dependent key map. The mapping data may include a first association between the key, the first member, and first location information. The first location information provides a location of the first t-node. In block 508, location data for locating the first association within the member-dependent key map is stored in a parent t-node of the first t-node.

In block 510, a second request is received from a second member of a distributed system to store second data in association with the key. The second data may differ from the first data. In block 512, in response to the second request, the second data is stored in the repository without overwriting the first data.

In block 514, mapping data is stored. The mapping data maps the key, relative to the second member, to a second t-node that stores the second data. The mapping data may include a second association between the key, the second member, and second location information that differs from the first location information. The second location information provides a location of the second t-node. In block 516, location data for locating the second association within the member-dependent key map is stored in a parent t-node of the second t-node.

In block 518, based on the mapping data, the first member is allowed to access the first data and not the second data. In block 520, based on the mapping data, the second member is allowed to access the second data and not the first data. Thus, the first data is member private data that is private to the first member, and the second data is member private data that is private to the second member. Member private data may be a single value. Member private data may be a complete subtree of key-value pairs.

System Architecture Overview

Figure 11:
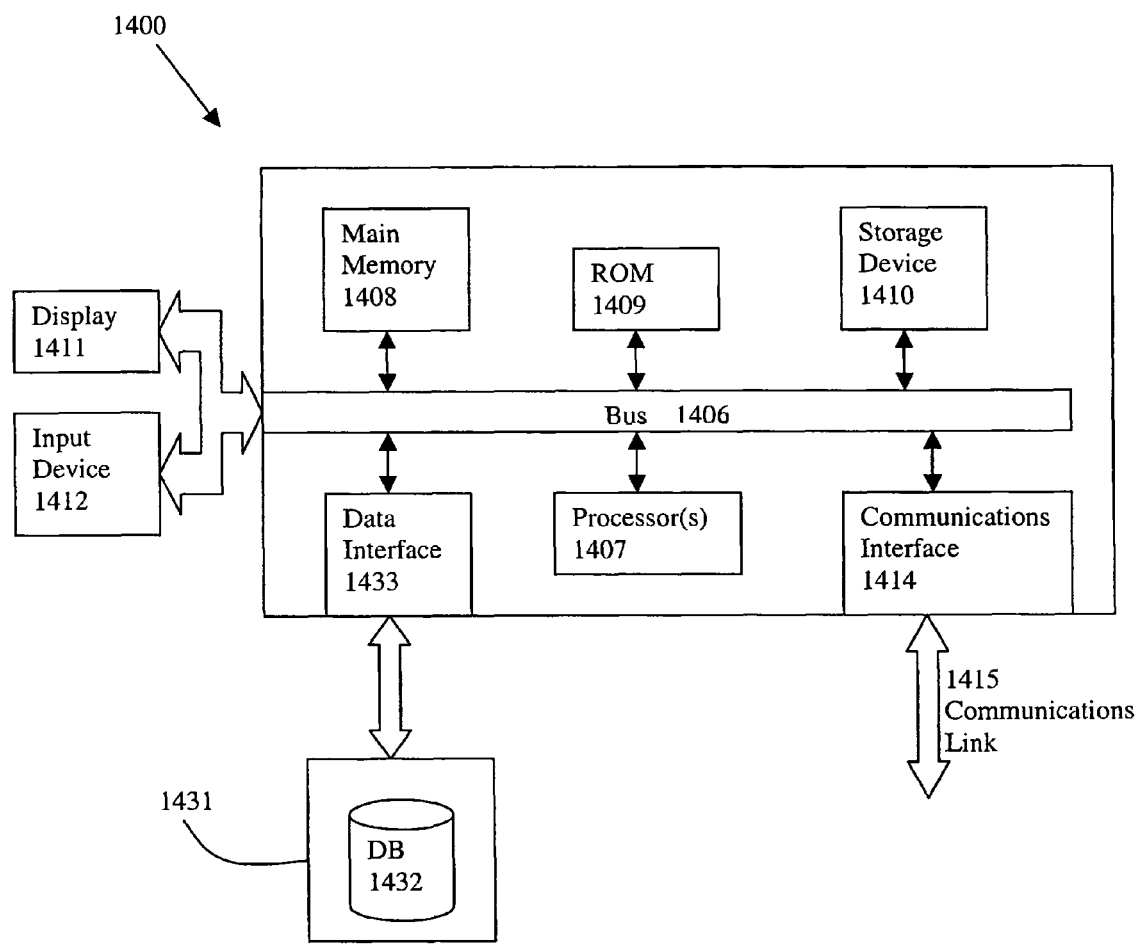
FIG. 11 is a diagram of a computer system with which the present invention can be implemented.

The execution of the sequences of instructions required to practice the invention may be performed in embodiments of the invention by a computer system 1400 as shown in FIG. 11. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for accessing data in a computing system, the method comprising:
   using at least one processor to perform a process, the process comprising:
   associating a hierarchical key with a first subtree to provide a first tree;
   associating the hierarchical key with a second subtree to provide a second tree;
   accessing against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and
   storing the hierarchical key on a volatile or non-volatile computer-usable medium, wherein members of different groups access different subtrees in different storage locations using a hierarchical data structure.

2. The method of claim 1 in which only a single member is part of the first or second group.

3. The method of claim 1 in which a member of the first group dynamically changes association to become a member of the second group.

4. The method of claim 1 further comprising:
   associating the hierarchical key with a default data or a default subtree, wherein access against the hierarchical key by any member that is not part of an established group will cause access to the default data or the default subtree.

5. The method of claim 1 that is applied to allow multiple members to access different data during a rolling upgrade, in which the hierarchical key comprises a key to data for a software product.

6. The method of claim 1 that is applied to allow different users to access different content at a web page, in which a web page address for the web page comprises the hierarchical key.

7. The method of claim 1 that is applied to allow access to different database views, in which the hierarchical key comprises an identifier of a view.

8. The method of claim 1 in which the hierarchical key is an index structure.

9. The method of claim 8 in which the key is a group dependent key.

10. The method of claim 9 in which the group dependent key is only visible to members of the first or second groups.

11. The method of claim 9 in which the group dependent key is associated with only a single member.

12. The method of claim 11 in which the key is a member dependent key.

13. The method of claim 9 in which the first or second subtree includes data that is shared static or dynamic data.

14. The method of claim 1 in which a link is created between the first subtree and the second subtree.

15. The method of claim 14 in which the link is a group dependent link.

16. The method of claim 14 in which the link is only visible to members of the first or second groups.

17. The method of claim 14 in which the link is bidirectional or multidirectional.

18. The method of claim 14 in which the link is implemented as a link to a group dependent key.

19. The method of claim 14 in which the link is implemented as one or more links to normal keys.

20. The method of claim 19 in which the one or more links are private links.

21. The method of claim 20 in which the private links are private symbolic links.

22. The method of claim 14 in which the first or second subtree includes data that is shared static or dynamic data.

23. The method of claim 1 in which data transformation is performed between a first data or the first subtree and a second data or the second subtree.

24. The method of claim 23 in which a data transformation function is used to perform the act of data transformation.

25. The method of claim 23 in which the data transformation is performed against data associated with a group dependent link or a group dependent key.

26. The method of claim 23 in which the act of data transformation changes data format, data value, index structure, or data structure.

27. The method of claim 23 in which a Backus-Naur Form (BNF) grammar is used to define a language for specifying the data transformation.

28. The method of claim 27 in which the Backus-Naur Form (BNF) grammar comprises semantics for implementing a data transformation selected from the group consisting of: data format change, data value change, transformation along a hierarchical structure, transformation applied to children in a hierarchy, transformation between different hierarchical structures, transformations related to security attributes of a key.

29. The method of claim 23 in which the data transformation is performed between three or more groups of members.

30. A computer implemented method for managing shared data in a computing system implemented by using a processor, comprising:
associating a hierarchical key with a first subtree of a first tree;
associating the hierarchical key with a link to a second subtree of a second tree;
accessing against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and
storing a first version of a data item for the hierarchical key associated with the first group in a first storage location on a volatile or non-volatile computer-usable medium and a second version of the data item for the hierarchical key associated with the second group in the second storage location on the volatile or non-volatile computer-usable medium, wherein the hierarchical key accesses different versions of the data item stored in different storage locations.

31. The method of claim 30 in which only a single member is part of the first or second group.

32. The method of claim 30 in which a member of the first group dynamically changes association to become a member of the second group.

33. The method of claim 30 that is applied to allow multiple members to access different data during a rolling upgrade, in which the hierarchical data access structure comprises a key to data for a software product.

34. The method of claim 30 that is applied to allow different users to access different content at a web page, in which a web page address for the web page comprises the index structure.

35. The method of claim 30 that is applied to allow access to different database views, in which the hierarchical data access structure comprises an identifier of a view.

36. The method of claim 30 in which a data transformation function is performed when accessing the hierarchical data access structure.

37. The method of claim 36 in which the data transformation function converts between a first expected format, value or structure and a second expected format, value, or structure.

38. The method of claim 37 in which the conversion between the first expected format, value, or structure and the second expected format, value, or structure is dynamically performed.

39. The method of claim 37 in which the data transformation function is applied when a data read operation is performed.

40. The method of claim 36 in which the first subtree or the second subtree includes data that are shared data.

41. The method of claim 40 in which the shared data is dynamic shared data.

42. The method of claim 36 in which the data transformation function is applied when a data update operation is performed.

43. A volatile or non-volatile computer-readable medium that stores instructions for accessing data in a computing system, the instructions performing a process comprising:
associating a hierarchical key with a first subtree to provide a first tree;
associating the hierarchical key with a second subtree to provide a second tree;
accessing against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and
storing the hierarchical key on a volatile or non-volatile computer-usable medium, wherein the hierarchical key represents different data structure values for accessing different subtrees for members of different groups.

44. The computer-readable medium of claim 43, wherein the hierarchical data access structure is a key.

45. The computer-readable medium of claim 44, wherein the key is a group dependent key.

46. A system for accessing data in a computing system, comprising:
a processor that is configured to:
associate a hierarchical key with a first subtree to provide a first tree;
associate the hierarchical key with a second subtree to provide a second tree;
access against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and
a volatile or non-volatile computer-readable medium that is configured to store the hierarchical key, wherein the hierarchical key represents different data structure values for accessing different subtrees for members of different groups.

47. The system of claim 46, wherein the hierarchical data access structure is a key.

48. The system of claim 47, wherein the key is a group dependent key.

49. A system for managing shared data in a computing system, comprising:
a processor that is to:
associate a hierarchical key with a first subtree to provide a first tree;

associate the hierarchical key with a link to a second subtree to provide a second tree;

access against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and a volatile or non-volatile computer-readable medium that is to store a first version of a data item for the hierarchical key associated with the first group in a first storage location on the volatile or non-volatile computer-usable medium and a second version of the data item for the hierarchical key associated with the second group in the second storage location on the volatile or non-volatile computer-usable medium, wherein the hierarchical key accesses different versions of the data item.

50. The system of claim 49, wherein the hierarchical data access structure is a key.

51. The system of claim 50, wherein the key is a group dependent key.

52. A volatile or non-volatile computer-readable medium that stores instructions for managing shared data in a computing system, the instructions performing a process comprising:

associating a hierarchical key with a first subtree to provide a first tree;

associating the hierarchical key with a link to a second subtree to provide a second tree;

accessing against the hierarchical key by a member of a first group causes access to the first subtree of the first tree and accessing against the hierarchical key by a member of a second group causes access to the second subtree of the second tree, wherein the first tree and the second tree comprise different hierarchies having different hierarchically structured data and the different subtrees are accessible by the hierarchical key; and storing a first version of a data item for the hierarchical key associated with the first group in a first storage location of a volatile or non-volatile computer-usable medium and a second version of the data item for the hierarchical key associated with the second group in the second storage location of the volatile or non-volatile computer-usable medium, wherein the hierarchical key accesses different versions of the data item.

53. The computer-readable medium of claim 52, wherein the hierarchical data access structure is a key.

54. The computer-readable medium of claim 53, wherein the key is a group dependent key.

* * * * *

UNITED STATES PATENT AND TRADEMARK OFFICE
CERTIFICATE OF CORRECTION

PATENT NO.        : 8,271,530 B2                                            Page 1 of 1
APPLICATION NO.   : 10/845016
DATED             : September 18, 2012
INVENTOR(S)       : Chatterjee et al.

It is certified that error appears in the above-identified patent and that said Letters Patent is hereby corrected as shown below:

On the Title Page:

Item (73): Assignee, please replace "Oracale International Corporation" with -- Oracle International Corporation --.

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,271,530 B2 | Page 1 of 1 |
| APPLICATION NO. | : 10/845016 | |
| DATED | : September 18, 2012 | |
| INVENTOR(S) | : Chatterjee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this
Sixteenth Day of September, 2014

Michelle K. Lee
*Deputy Director of the United States Patent and Trademark Office*